United States Patent
Grinchenko et al.

(10) Patent No.: US 7,778,926 B1
(45) Date of Patent: Aug. 17, 2010

(54) PROCESSES FOR VERIFYING, AND ACCEPTING CONTENT POSTINGS FROM, CREATORS OF WORKS REPRESENTED IN AN ELECTRONIC CATALOG

(75) Inventors: Pavlo O. Grinchenko, Bellevue, WA (US); Erin H. Kraemer, Seattle, WA (US); Michael I. Hyman, Seattle, WA (US); Jeffrey P. Bezos, Greater Seattle, WA (US); Ronald J. Schoenbaum, Newport Coast, CA (US)

(73) Assignee: Amazon Technologies, Inc., Reno, NV (US)

( * ) Notice: Subject to any disclaimer, the term of this patent is extended or adjusted under 35 U.S.C. 154(b) by 763 days.

(21) Appl. No.: 11/277,891

(22) Filed: Mar. 29, 2006

(51) Int. Cl.
*G06F 11/30* (2006.01)
(52) U.S. Cl. .......................... 705/50; 705/51
(58) Field of Classification Search ............ 705/50
See application file for complete search history.

(56) References Cited

U.S. PATENT DOCUMENTS

| | | | |
|---|---|---|---|
| 5,815,665 | A | 9/1998 | Teper et al. |
| 6,598,026 | B1 | 7/2003 | Ojha et al. |
| 6,889,250 | B2 | 5/2005 | Bezos et al. |
| 7,050,993 | B1 * | 5/2006 | Piikivi et al. ............ 705/26 |
| 7,290,035 | B2 * | 10/2007 | Mattathil .................. 709/206 |
| 7,299,493 | B1 * | 11/2007 | Burch et al. ................ 726/5 |
| 7,310,612 | B2 * | 12/2007 | McQueen et al. ........... 705/26 |
| 7,316,027 | B2 * | 1/2008 | Burch et al. ................ 726/1 |
| 7,373,512 | B1 * | 5/2008 | Just ........................ 713/176 |
| 7,574,479 | B2 * | 8/2009 | Morris et al. ............. 709/207 |
| 2002/0138354 | A1 | 9/2002 | Seal et al. |
| 2003/0172120 | A1 * | 9/2003 | Tomkow et al. ............ 709/206 |
| 2003/0217006 | A1 * | 11/2003 | Roever et al. ............... 705/50 |
| 2003/0233422 | A1 | 12/2003 | Csaszar et al. |

(Continued)

FOREIGN PATENT DOCUMENTS

WO    WO 2005091145 A1 *  9/2005

OTHER PUBLICATIONS

"Unidentifiability and Accountability in Electronic Transactions", Elsie Van Herreweghen, Katholieke Universiteit Leuven {Faculteit Toegepaste Wetenschappen Arenbergkasteel, B-3001 Heverlee-Leuven (Belgium), Oct. 2004, 254 pages.*

(Continued)

*Primary Examiner*—Calvin L Hewitt, II
*Assistant Examiner*—James D Nigh
(74) *Attorney, Agent, or Firm*—Knobbe, Martens, Olson & Bear LLP

(57) ABSTRACT

An electronic catalog system provides an interface for users to author and post content for viewing by others. Users who are verified as creators of works represented in the electronic catalog (e.g., authors of books) are additionally granted the capability to post content that is displayed on the catalog pages of such works with attribution to the works' creators. In one embodiment, the system is capable of verifying a user's claim to be a creator of a particular work through automated communications with a third party verifier designated by the user. The third party verifier may, for example, be a publisher (in the case of books), a recording company (in the case of musical works), or a motion picture studio (in the case movies).

22 Claims, 15 Drawing Sheets

U.S. PATENT DOCUMENTS

| | | | |
|---|---|---|---|
| 2004/0181581 A1* | 9/2004 | Kosco | 709/206 |
| 2005/0033657 A1 | 2/2005 | Herrington et al. | |
| 2005/0038717 A1* | 2/2005 | McQueen et al. | 705/27 |
| 2005/0068983 A1* | 3/2005 | Carter et al. | 370/480 |
| 2005/0144239 A1* | 6/2005 | Mattathil | 709/206 |
| 2005/0171872 A1* | 8/2005 | Burch et al. | 705/29 |
| 2005/0172116 A1* | 8/2005 | Burch et al. | 713/155 |

OTHER PUBLICATIONS

CNET News article titled "Google book scanning still on hold," dated Nov. 4, 2005, printed from www.news.com.

* cited by examiner

PROCESSES FOR VERIFYING, AND ACCEPTING CONTENT POSTINGS FROM, CREATORS OF WORKS REPRESENTED IN AN ELECTRONIC CATALOG

BACKGROUND OF THE INVENTION

1. Field of the Invention

The present invention relates to messaging systems for enabling users to securely post content in association with items represented in an electronic catalog. The invention also includes processes for verifying access credentials of those who create or contribute to the creation of particular works or products represented in an electronic catalog.

2. Description of the Related Art

Web sites and other types of interactive systems commonly host electronic catalogs for assisting users in locating and evaluating various types of items. The items may, for example, include book titles, movie and music titles, downloadable software, services, stock assets, businesses, and/or any other type of item that may be represented in a database. Electronic catalog systems also commonly support the ability for users to conduct various types of item-related transactions, such as purchasing an item, downloading an item, or selling an item.

To enhance the browsing experiences of users, electronic catalog systems commonly implement various types of features for assisting users in efficiently locating and evaluating catalog items. For example, some systems implement recommendation algorithms for recommending specific catalog items to users. The items are commonly recommended based on the purchase histories, browsing histories, and other types of user profile data reflective of users' interests.

Some systems also allow users to post reviews on specific catalog items. The reviews submitted for a particular item are typically displayed on a detail page for that item. In some cases, the associated user interface provides an option for users to vote on whether a particular review is helpful. A current tally of the votes submitted on a particular review is typically displayed to assist readers in assessing the review. The vote tallies may also be used to inhibit the display of poor quality reviews. In addition, the votes are used in some systems to generate and display ratings of specific reviewers, such that the readers of a given review can take into consideration the reputation of the associated reviewer.

Despite the existence of these and other features, electronic catalogs commonly lack the types of compelling content needed to attract and maintain the interests of users. One reason for this deficiency is that the operators of such systems typically lack the resources needed to generate such content. The present invention seeks to address this deficiency.

SUMMARY OF THE DISCLOSURE

A system is disclosed in which users of an electronic catalog system can author and submit short postings referred to herein as "blurbs." The blurbs may, but need not, refer to or be associated with specific items in the electronic catalog. The blurbs submitted by a particular author are preferably made available for viewing on a corresponding web log or "blog" page of the author (i.e., each submitted blurb may serve as a blog entry). Blurbs may also be obtained from other, independent sources, such as through RSS feeds from external web sites that host blogs.

In one embodiment of the system, a personalized blurb selection component selects specific blurbs to present to users of the catalog. The blurbs presented to a target user are preferably selected based at least in part on a history, referred to as an "item selection history," of the catalog items selected by the target user to purchase, view, review, rate, and/or perform some other type of action. For example, one personalized blurb selection algorithm that may be used selects blurbs from authors having item selection histories similar to the item selection history of the target user. Another personalized blurb selection algorithm evaluates each blurb as a selection candidate by evaluating the extent to which those with similar item selection histories to that of the target user responded favorably to the blurb, such as by casting a favorable vote or by forwarding the blurb to another user. Yet another personalized blurb selection algorithm selects blurbs that reference catalog items that (a) have been selected by the target user, and/or (b) are similar to items selected by the target user. Blurbs may also be selected based on other types of user preference data.

At least some of the blurbs selected to present to a particular target user are preferably displayed as entries in a personalized log or "plog" of the target user. A certain number of new blurbs may be added to each user's plog periodically, such as once per day, so that users are continuously provided with fresh content. A user's plog, or content selected therefrom, may be presented to the user on a home or gateway page associated with the electronic catalog, on a separate plog page, and/or on various other pages associated with the catalog. Blurbs may also be selected to present based on the context of the target user's browsing session; for example, blurbs may be selected based on the item category currently being viewed by the user, or based on the set of items viewed during the current browsing session.

The blurbs are preferably displayed to users together with an option to explicitly or implicitly vote on or "rate" each blurb. The votes cast on a particular blurb affect the extent to which that blurb is thereafter selected to present to other users. In addition, the votes collected over time for the blurbs from a particular author are preferably taken into consideration in selecting the frequency with which new blurbs from that author are to be displayed to specific target users.

In one embodiment of the system, users who are "creators" of particular works represented in the catalog (e.g., authors of books, musical artists associated with particular CDs or musical works, actors and directors of movies, etc.) are verified as such via a verification process. This verification process may involve automated communications with the user/creator and a third party verifier to verify certain information, such as the creator's email address. Once a user has been verified as a creator of a work, special functionality is exposed to the user for purposes of creating blurbs that are attached to the work. These special "creator-generated" blurbs may, for example, be posted on the item detail pages of the associated works with attribution to the work's creator, and/or may automatically be inserted into the plogs of users who have purchased such works. A user may also subscribe to the blurb stream of a particular creator, in which case some or all blurbs posted by the creator may automatically be added to the plog of the subscribed user.

The system thus provides fresh, targeted content from a wide range of sources to users of a catalog system.

Neither this summary nor the following detailed description is intended to define the invention. The invention is defined by the claims.

BRIEF DESCRIPTION OF THE DRAWINGS

FIG. 9 illustrates an example creator blurb entry screen that may be exposed to verified creators of works represented in an electronic catalog.

FIG. 11 illustrates an example blog page of a verified author of books.

DETAILED DESCRIPTION OF THE PREFERRED EMBODIMENTS

I. Overview

Figure 1:
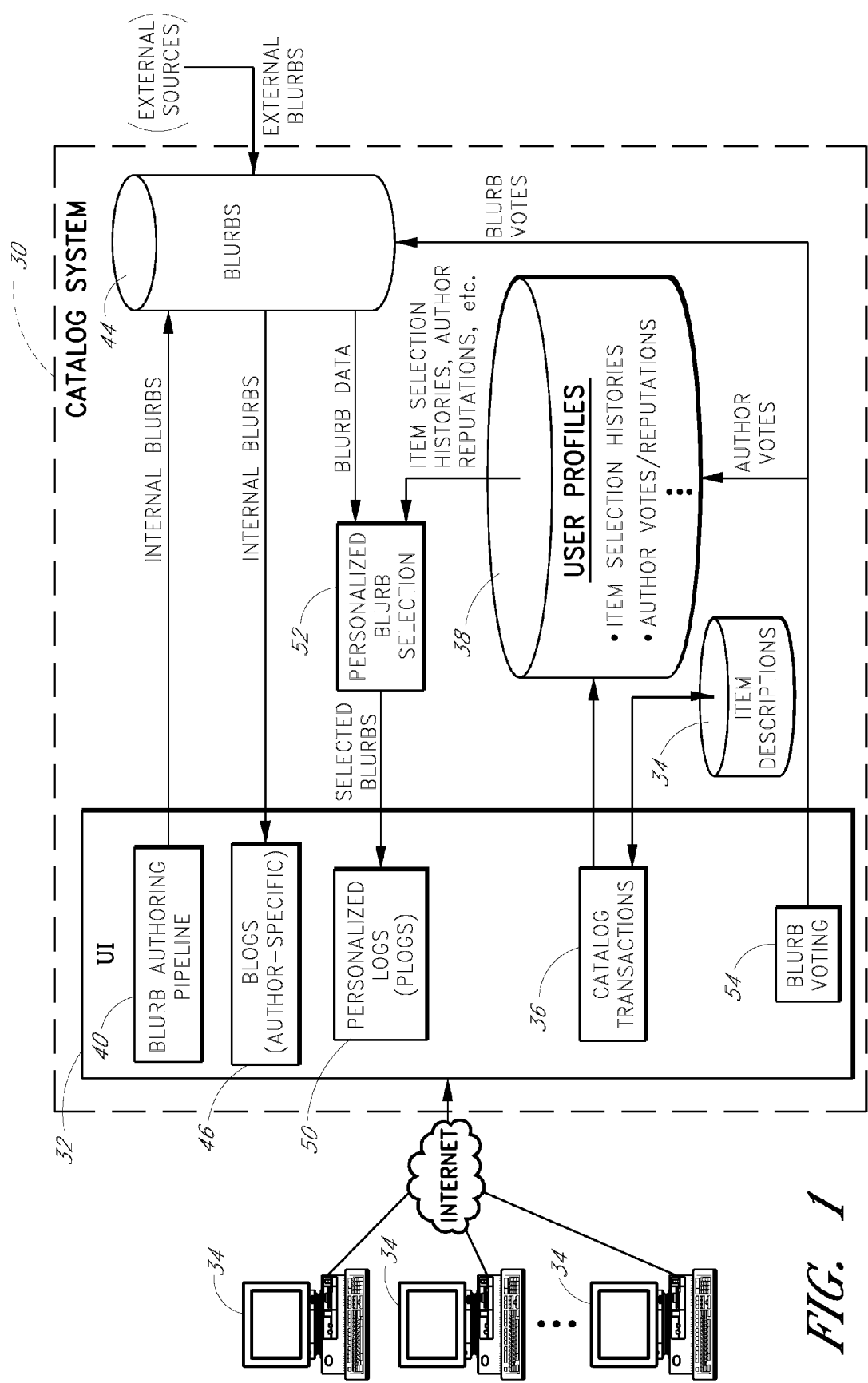
FIG. 1 illustrates an electronic catalog system according to one embodiment of the invention.

FIG. 1 illustrates an electronic catalog system 30 according to a preferred embodiment of the invention. The system 30 includes a user interface (UI) 32 that is accessible to Internet users via user computers 34 and/or other types of devices (PDAs, mobile telephones, etc.). The user interface 32 is preferably implemented as a collection of web pages, but may more generally be implemented using any platform that supports interactive browsing (e.g., online services networks, voice-based browsing systems, interactive television systems, etc.).

The user interface 32 preferably provides functionality for users to browse an electronic catalog of items, and to perform transactions with respect to such items. The items may, for example, include books, video/DVD titles, music CDs, other types of physical products (new and/or used), newspaper or journal articles, music files, software downloads, stocks and bonds, and/or any other type of item commonly represented within an electronic catalog. The catalog may be that of a single business entity or a collection of business entities. Descriptions of the items represented in the electronic catalog are maintained in an item descriptions database 34. Each catalog item represented within the database 34 typically has a unique item ID.

In one embodiment, users can obtain detailed information about, and initiate purchases of specific items by browsing to corresponding item detail pages. The catalog may also include a browse tree, a search engine, and/or other tools for assisting users in locating specific catalog items. The types of transactions supported by the system may vary by item type, but may include, for example, purchases, sales to others, downloads, bids, and/or submissions of item reviews or ratings. For instance, the user interface 32 may support the ability for users to search for and purchase physical or downloadable products from a catalog of products. The user interface also includes functionality for users to set up and manage personal accounts. The user interface features for navigating the electronic catalog, performing transactions, and setting up/managing user accounts, are generally represented in FIG. 1 by the component 36 labeled "catalog transactions."

The catalog transactions component 36 accesses and updates a user profiles database 38 in response to actions performed by online users. This database 38 preferably maintains user-specific profiles that reflect user affinities for specific items and/or item categories. For example, the database 38 may maintain for each user an "item selection history" specifying all catalog items the respective user has purchased, reviewed, rated, viewed via an item detail page, downloaded, added to a personal wish list or shopping cart, and/or for which the user has performed some other type of item-affinity-evidencing action. The types of item-affinity-evidencing actions for which user-specific histories are maintained will generally vary depending upon the nature and purpose of the system 30 (e.g., user opinions, retail sales, user-to-user sales, online access to media content, music downloads, etc.). The user profiles may also include information about, for example, the item categories selected by each user for browsing, the search queries submitted by each user, and/or community memberships. More generally, the user profiles database 38 may store any information reflective of users' preferences for specific items and/or item categories (generally referred to herein as "user preference data").

As further illustrated in FIG. 1, the user interface 32 preferably also includes a blurb authoring pipeline 40 through which users can write and submit pieces of content referred to herein as "blurbs." The blurbs are typically in the form of text, although images and other types of content may also be supported. The blurb authoring pipeline 40 may include one or more tools for assisting blurb authors in adding references to specific items or item categories of the catalog. For example, a link generation tool may be provided for creating and inserting links to specific item detail pages and browse node pages. A tool may also be provided for looking up the unique IDs of specific items. The blurb authoring pipeline 40 may require users to log in before posting a blurb, such that the blurbs can be reliably attributed to their respective authors. As discussed below in section V, the blurb authoring pipeline 40 may expose special functionality to users that have been verified to be creators of works represented in the catalog (e.g., authors of books), such that these users can post blurbs that are logically attached to their respective works.

In one embodiment, the blurb authoring pipeline 40 may also provide an expiration date feature through which a blurb author can set an expiration date for a blurb. Following this expiration date, the system no longer displays the blurb. For example, if a blurb discusses a book reading on a certain date, and the blurb author also chooses the book reading date as the expiration date for the post, then the blurb will no longer be displayed after the book reading occurs.

Blurbs posted via the blurb authoring pipeline 40 are stored in a blurbs database 44. As discussed below, blurbs are selected from this database 44 to present to specific users according to one or more personalized blurb selection algorithms. As depicted by the "blogs" user interface component 46 in FIG. 1, users of the system 30 can also preferably view the blurbs created via the authoring pipeline 40 in an author-specific blog format. For example, users may visit a page associated with a particular author to view a chronological log of the blurbs submitted by that author, or equivalently, to view that author's blog. Each blurb created using the blurb authoring pipeline 40 thus preferably becomes an entry within the corresponding author's publicly-accessible blog. The system may also provide functionality for the blurb authors to upload images, such as personal photographs, for display with their respective blogs. Author-specific blogs may alternatively be omitted (i.e., blurbs created via the blurb authoring pipeline 40 need not be displayed as blog entries).

If author-specific blogs are provided, each such blog may be published using RSS ("RDF Site Summary" or "Rich Site Summary")—an XML format for syndicating web content—so that blog aggregators and other types of web sites can re-publish the content contained in such blogs. The use of RSS to share and license web content across web sites is well known in the art. Users may also be given the option to control whether their respective blogs are to be made available via RSS.

As depicted in FIG. 1, the blurbs database 44 may also be populated with blurbs obtained from one or more external sources. For example, in the preferred embodiment, blurbs are periodically uploaded to the database 44 via RSS feeds from various external web sites that host blogs, newsletters, and/or other forms of user-created content. An RSS feed is generally an RSS-format web page that is used as a recurring source of content. Each such RSS page is preferably retrieved periodically, such as several times a day, to check for new items (blog entries, news articles, etc.). Some or all of the new items located through this process are added to the blurbs database 44 as blurbs. New RSS feeds are preferably discovered using a spider program that starts with a known list of RSS feeds (e.g., from a known RSS feed aggregator), retrieves RSS pages from such feeds, and scans these pages for references to other feeds. The user interface 32 may also include a form for enabling users to specify the locations of RSS feeds.

Blurbs created via the blurb authoring pipeline 40 are referred to herein as "internal blurbs," and blurbs obtained from other sources are referred to as "external blurbs." An external blurb may be represented within the blurbs database 44 without actually copying over the entire blurb to the database 44. Although both internal and external blurbs are used in the preferred embodiment, as will be recognized, the system may be implemented using only one type of blurb (internal or external) and not the other. Further, the system may 30 include an API (application program interface) through which users of the system 30 can edit their blogs, and/or add new blog entries (blurbs), using web services. A web service is typically in the form of machine-readable SOAP (Simple Object Access Protocol) message.

According to one feature of the system, blurbs are also selected from the database 44 to present to specific users based the preference data of such users. The task of selecting the blurbs is performed by a "personalized blurb selection" component 52, which implements one or more blurb selection algorithms as described below. The personalized blurb selection component 52 selects blurbs to present to a given user based at least in part on one or more of the aforementioned types of user preference data. For example, a set of blurbs may be selected to present based on the target user's item selection history or a selected portion of that history. More generally, blurbs may be selected based in-whole or in-part on any information reflective of the user's preferences for specific items and/or item categories.

As discussed in further detail below, the blurbs are preferably selected using a set of personalized blurb selection algorithms that take into account the item selection histories of users. One such algorithm selects blurbs from authors having item selection histories similar to the item selection history of the target user. Another personalized blurb selection algorithm evaluates each blurb as a selection candidate by evaluating the extent to which those with similar item selection histories to that of the target user responded favorably to the blurb. Yet another personalized blurb selection algorithm selects blurbs that reference catalog items that (a) have been selected by the target user, such as a blog by a creator of an item purchased by the target user, and/or (2) are similar to items selected by the target user.

The blurbs selected to present to a target user are preferably presented in the form of a personalized log or "plog." As with blogs, plogs are preferably in the form of chronological sequences of blurbs. Unlike a blog, a plog will typically contain entries (blurbs) from many different authors, and will be specific to a particular target user (i.e., plogs generally are not publicly accessible). A selected number of new blurbs (e.g., ten or twenty) may be added to each user's plog periodically, such as once per day. In one embodiment, each user of the system 30 can access a plog page to view his or her plog (see FIG. 4, discussed below). A condensed representation of the plog may also be displayed on a home or gateway page of the catalog system (see FIG. 5), and possibly on other types of pages associated with the catalog. In some embodiments, a user's plog may also display auto-generated messages related to transactions conducted by the user, such as a message indicating that an order placed by the user has recently shipped.

Where external blurbs are included within the plogs, the amount of blurb text displayed may be selected based on the type of license involved. For example, blurbs obtained from external blogs with "by attribution" licenses may be displayed in full. For other types of blog licenses such as "non-commercial" or "no derivative works," a selected excerpt of each external blurb may be displayed (e.g., the title plus the first twenty words), together with a link to the originating site.

In addition to providing content for plogs (personalized logs of selected blurbs), blurbs may be selected to present to users based on the contexts of the users' browsing sessions. For example, one or more blurbs may be selected based on the item or item category currently being viewed by the user, based on the item or item categories viewed during the current browsing session, and/or based on the contents of the user's shopping cart. These context-dependent blurbs may be presented on any appropriate page, such as an item detail page or a browse node page of the electronic catalog.

As depicted by the "blurb voting" component 54 in FIG. 1, users are preferably given the option to rate some or all of the blurbs they review by casting votes. The votes may be cast according to a specified rating scale (e.g., "poor," "average," and "good"), and may be based on quality, relevance, or any other appropriate criteria. The option to vote on a blurb may be presented whenever that blurb is displayed, or may be presented only when the blurb is displayed as the result of a selection algorithm. Each vote is preferably recorded in the blurbs database 44, and preferably affects the frequency with which the corresponding blurb is subsequently selected to present to other users. Although the votes are preferably blurb-specific, the system may additionally or alternatively allow users to vote on an entire blog that contains many blurbs from the same author. Further, as discussed below, implicit forms of voting may be used.

As depicted by the arrow labeled "author votes" in FIG. 1, a vote on an internal blurb (or blog) also preferably serves as a vote on the corresponding author, and is thus recorded by the blurb voting component 54 in association with the author's user ID. Authors of blurbs can thus develop "reputations" over time, which may in turn be taken into consideration by the personalized blurb selection component 52. For example, when a author creates a new blurb, the author's reputation may be used to select an initial injection rate for injecting the blurb into the plogs of users; thereafter, the injection rate may be adjusted based on feedback (votes) from readers of the blurb. An author's reputation may be represented as a reputation score or grade that is based on the following and/or other criteria, the number of blurbs written, the total number of votes cast on such blurbs, and the average rating of such votes. Author vote and reputation data is preferably maintained for all authors of internal blurbs, and may also be maintained for authors of external blurbs.

A vote cast in response to the personalized selection and display of a blurb may be treated as a vote on the quality of the particular selection algorithm used to select the blurb. For example, if several different competing selection algorithms are used (as discussed below), the associated blurb votes may be used over time to evaluate the relative accuracy of each such algorithm. Selection algorithms that perform poorly relative to the others may be dropped or modified, or may be accorded a lesser weight in selecting blurbs to present. Further, if a given user has consistently responded favorably to blurbs nominated by a particular selection algorithm, that selection algorithm may be treated as being more reliable for that particular user.

In addition to the blurb selection and display methods mentioned above, the system 30 may provide various other navigation features for assisting users in locating blurbs and blogs. For example, the system may also use the aforementioned votes to generate and display a publicly accessible page that lists or contains the blurbs that are currently the most popular among the entire user population, or that are currently gaining in popularity the fastest.

The internal and external blurbs are preferably represented within the blurbs database 44 together with various elements of associated data. The data stored for a given blurb may include, for example, a unique blurb ID, the ID of the blurb author, the date of creation, the author's reputation as of the blurb's creation date, the number of votes within each rating category, the contexts of such votes (e.g., whether in response to a personalized blurb selection algorithm versus some other blurb surfacing method), IDs of any items referenced by the blurb, whether the blurb is internal versus external, etc. These and other data elements may be used by the personalized blurb selection component 52. A background process (not shown) may automatically prune the database 44 of blurbs that are outdated or have unfavorable vote tallies.

A given blurb may also be stored in the database together with one or more author-specified "hints" that identify classes of target readers. For example, the author of a blurb may specify that the blurb should be displayed to users who have purchased a particular item, to users who reside in a particular region, or to users who belong to a particular community. Any hints provided by the authors may be taken into consideration by the personalized selection algorithms. On the other hand, authors of items featured in the online catalog may directly associate their blurbs with the items using a different process, as discussed below.

The system depicted in FIG. 1 thus provides users with fresh, personalized content (blurbs) from numerous blurb-authors during visits to the electronic catalog, increasing the likelihood of frequent return visits by such users. In many cases, the selected blurbs also include information that assists users in making informed item selection decisions. For example, a given blurb may reference one or more items that are of interest to the target user, and may indicate the author's opinion about such items. The system also preferably enables users to maintain their own publicly accessible blogs.

Figure 8:
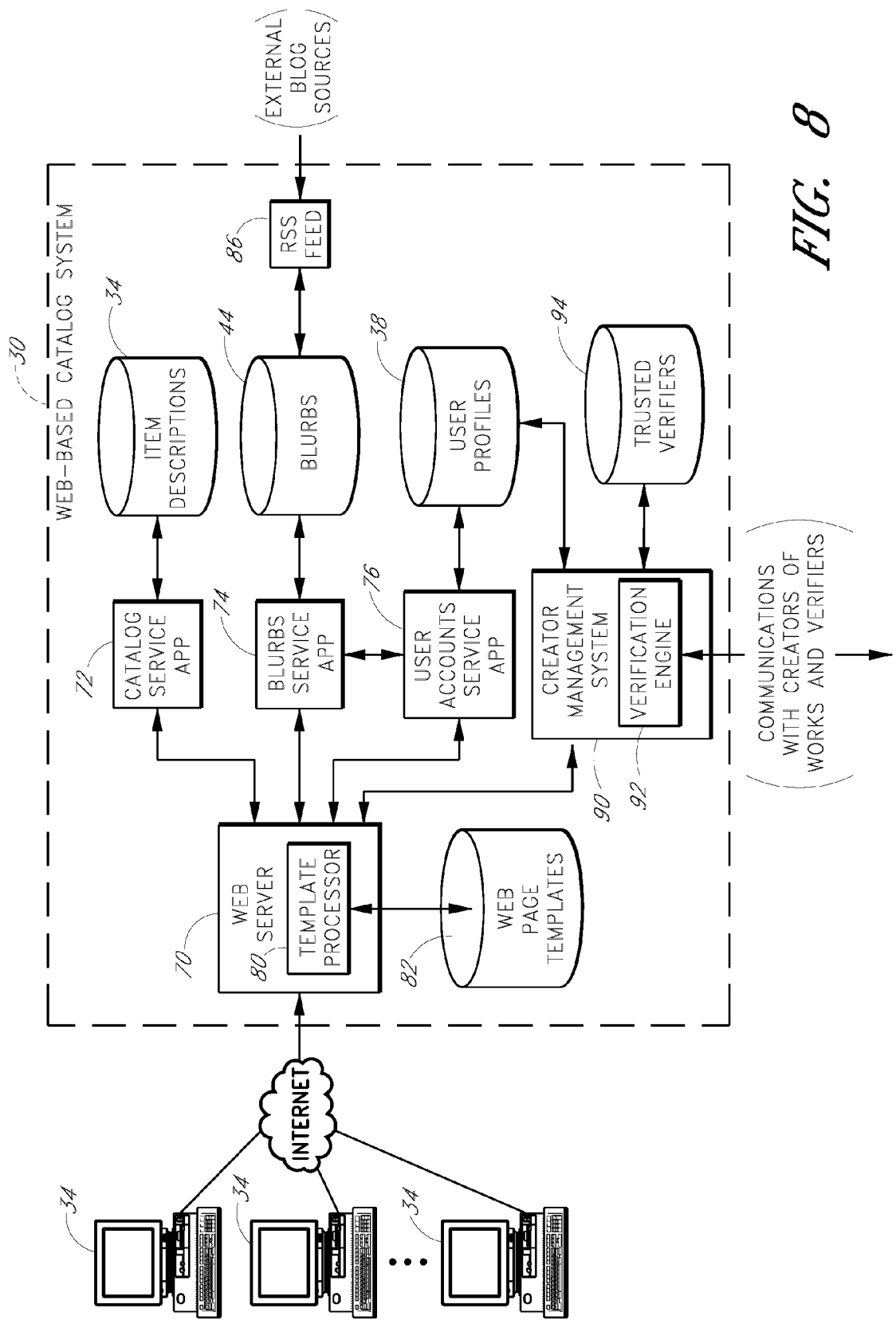
FIG. 8 illustrates a set of web site components that may be used to implement the system of FIG. 1.

The foregoing functions may be implemented within executable software that runs on one or more general purpose computers. These functions may be embodied within a web site system, an online services network, or any other type of multi-user system that supports interactive browsing of catalog content. One example of a general web site architecture that may be used is shown in FIG. 8 and is discussed below.

II. Example Screen Displays

Figure 2:
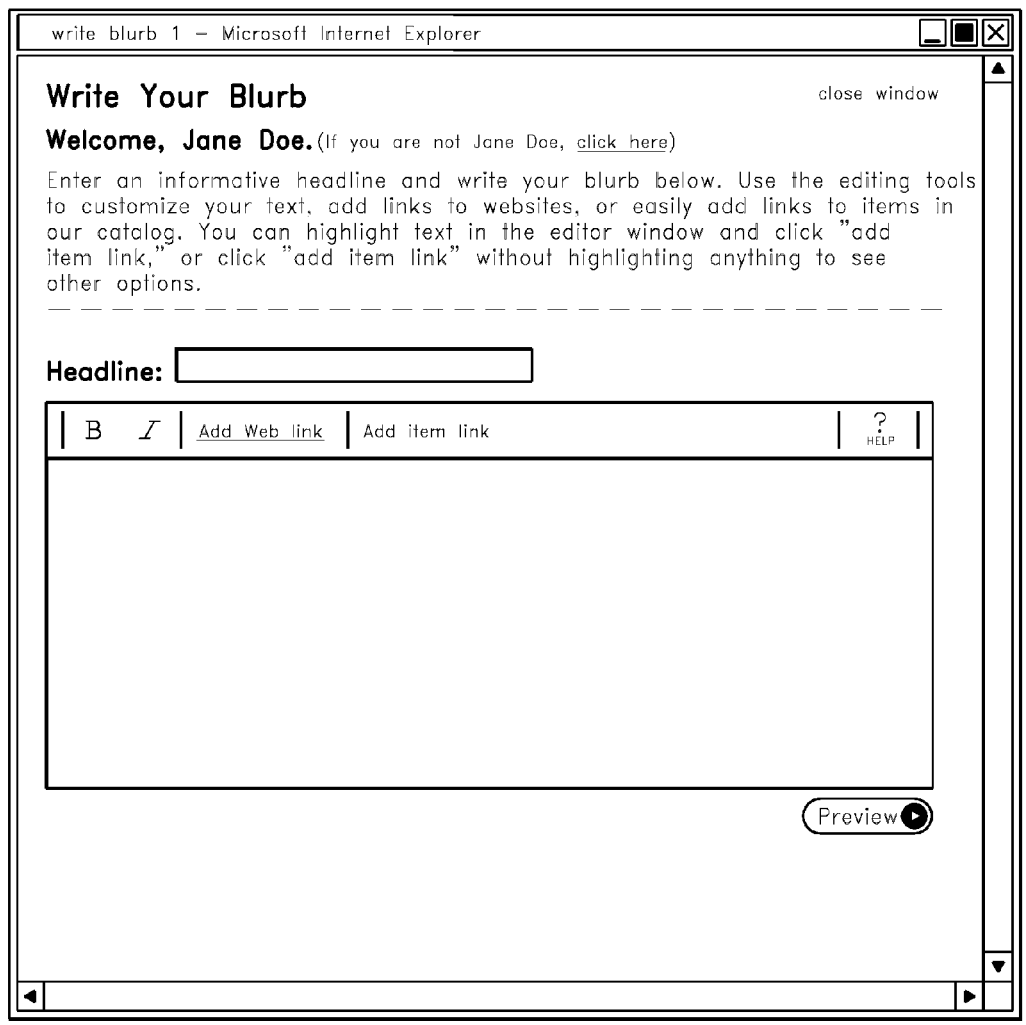
FIGS. 2 and 3 illustrate example screen displays of the blurb authoring pipeline of FIG. 1.
Figure 3:
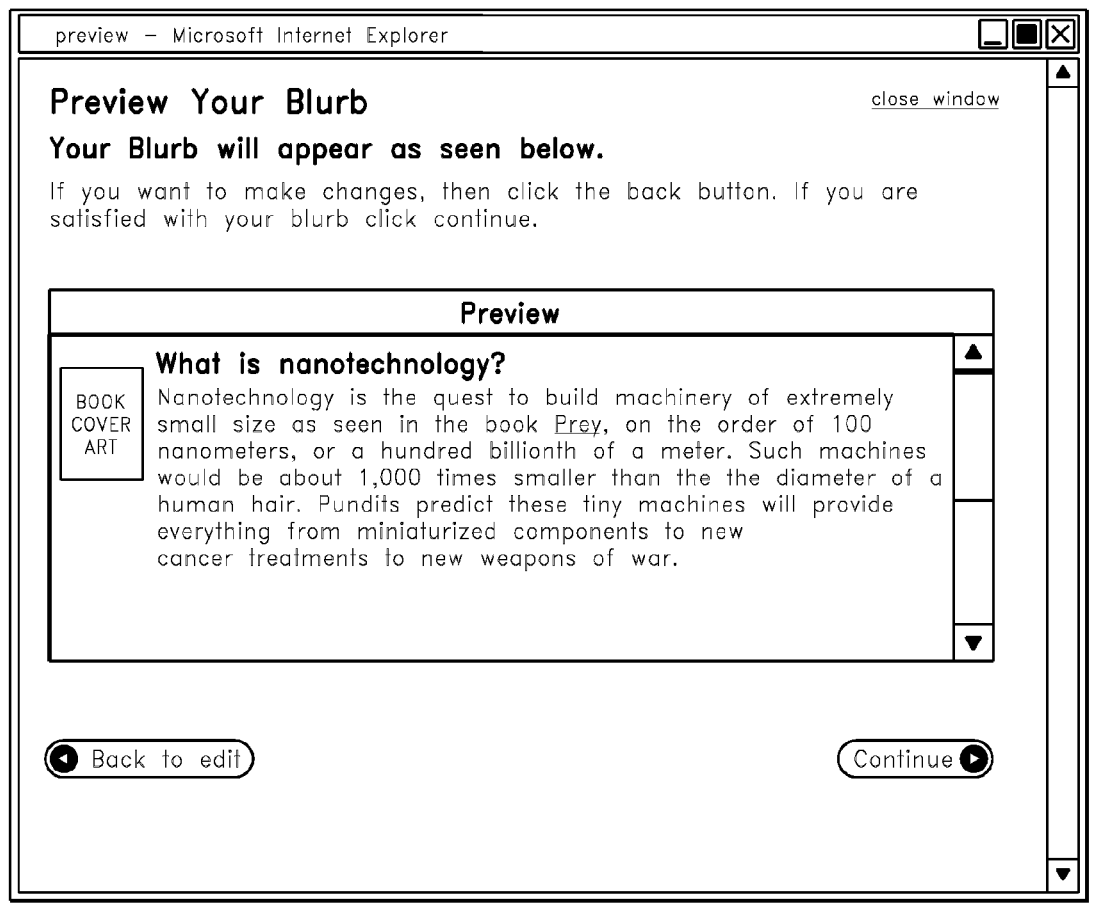

FIGS. 2 and 3 illustrate two example screens of the blurb authoring pipeline 40. The first screen (FIG. 2) provides instructions for creating a blurb, and includes an area for entering the headline and body of the blurb. In this example, blurb authors are encouraged to add links to specific items in the catalog, and are provided with a tool for doing so. The author can also insert links to other web sites. As discussed below in section V, a special version of the blurb posting form shown in FIG. 2 may be presented to verified creators of works (see FIG. 9) to enable these users to post blurb's that are attached to their respective works.

Once the blurb text has been entered, the author selects the "preview" button to view a "preview your blurb" screen of the type shown in FIG. 3. In this example, the author has added a link to a particular catalog item, and more specifically, to a particular book title. A graphic associated with this book title has automatically been added to the display. Subsequent screens of the blurb authoring pipeline may allow the user to add one or more hints regarding the target audience for the blurb, as explained above. The author may also be required to log in before posting the blurb.

Once the blurb has been posted, it preferably appears on the author's publicly accessible blog page as an entry within a chronological log of entries. In addition, the blurb becomes available to the personalized blurb selection algorithms, and to any other selection algorithms used to select blurbs for display.

Figure 4:
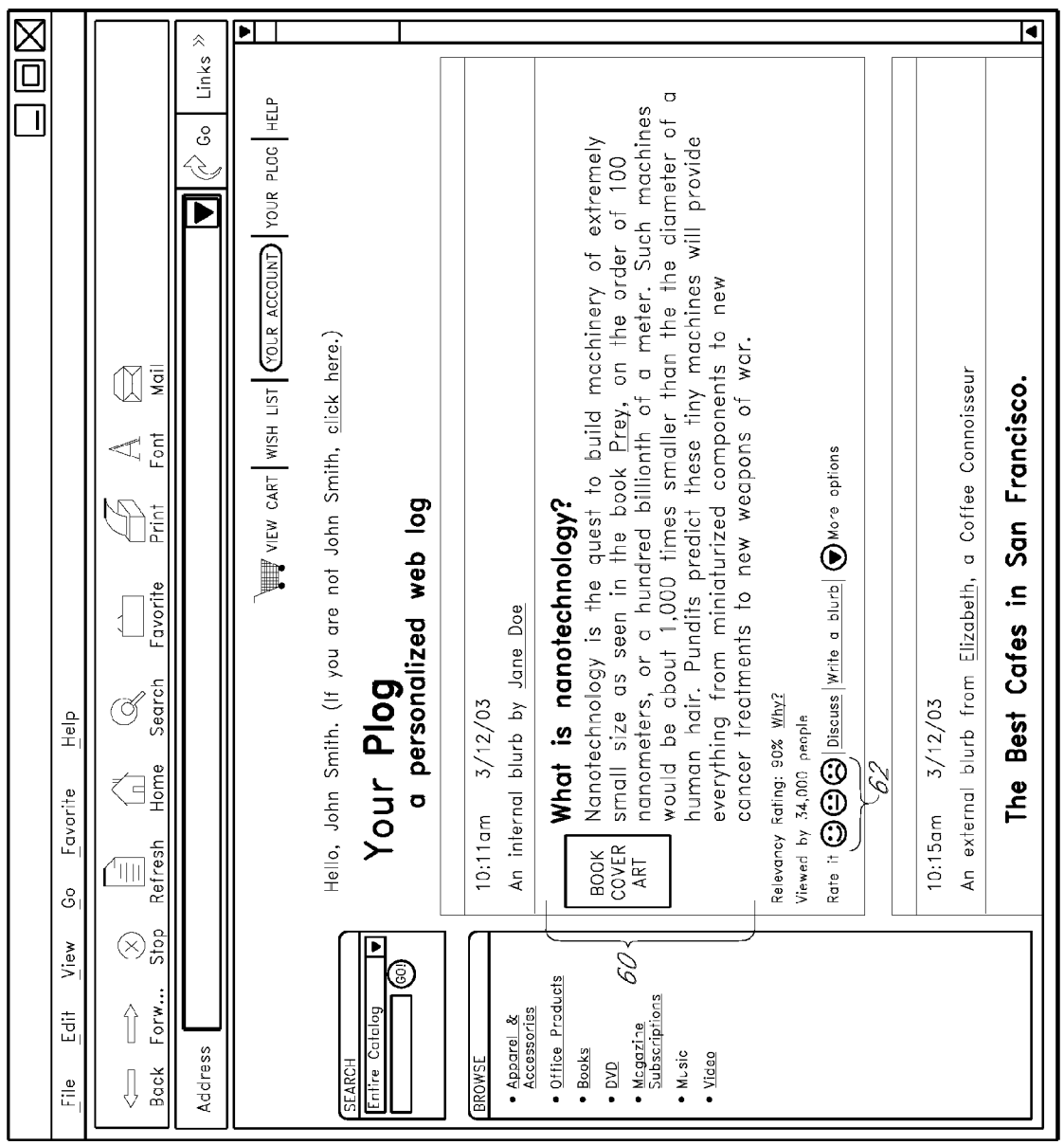
FIG. 4 illustrates a personal web log or "plog" page according to one embodiment of the invention.

FIG. 4 illustrates a portion of an example plog page, with a single plog entry (blurb) 60 shown in its entirety. Each entry within the plog is a blurb that was selected for the target user (the plog's "owner") by the personalized blurb selection component 52. The plog is presented in reverse chronological order such that the most recent entries appear at the top of the page. The blurb 60 is displayed together with the following information: the date and time of creation, the name of the author (displayed as a link to the author's blog page), a graphic of the referenced item, an indication of the number of users who have viewed the blurb 60, and a relevancy rating reflective of a score generated by a personalized selection algorithm.

Also displayed is a set of icons 62 for voting on the blurb. In this example, three rating levels are supported: good, neutral, and poor. The voting interface may alternatively use a different number of rating levels. For example, a 2-level scale may be used in which users are asked whether they liked the blurb, or a 5-level scale may be used in which users are asked to rate the blurb on a scale of 1-5.

With further reference to FIG. 4, a "more options" drop down menu allows the plog's owner to access other options, such as an option to send the blurb to a friend, and an option to create a new blurb that references the displayed blurb 60. Certain types of user actions, such as sending the blurb to a friend, may optionally be treated as votes in favor of the blurb (i.e., implicit voting may be supported). The plog page also includes a search engine box and various links for searching and browsing the catalog.

Figure 5:
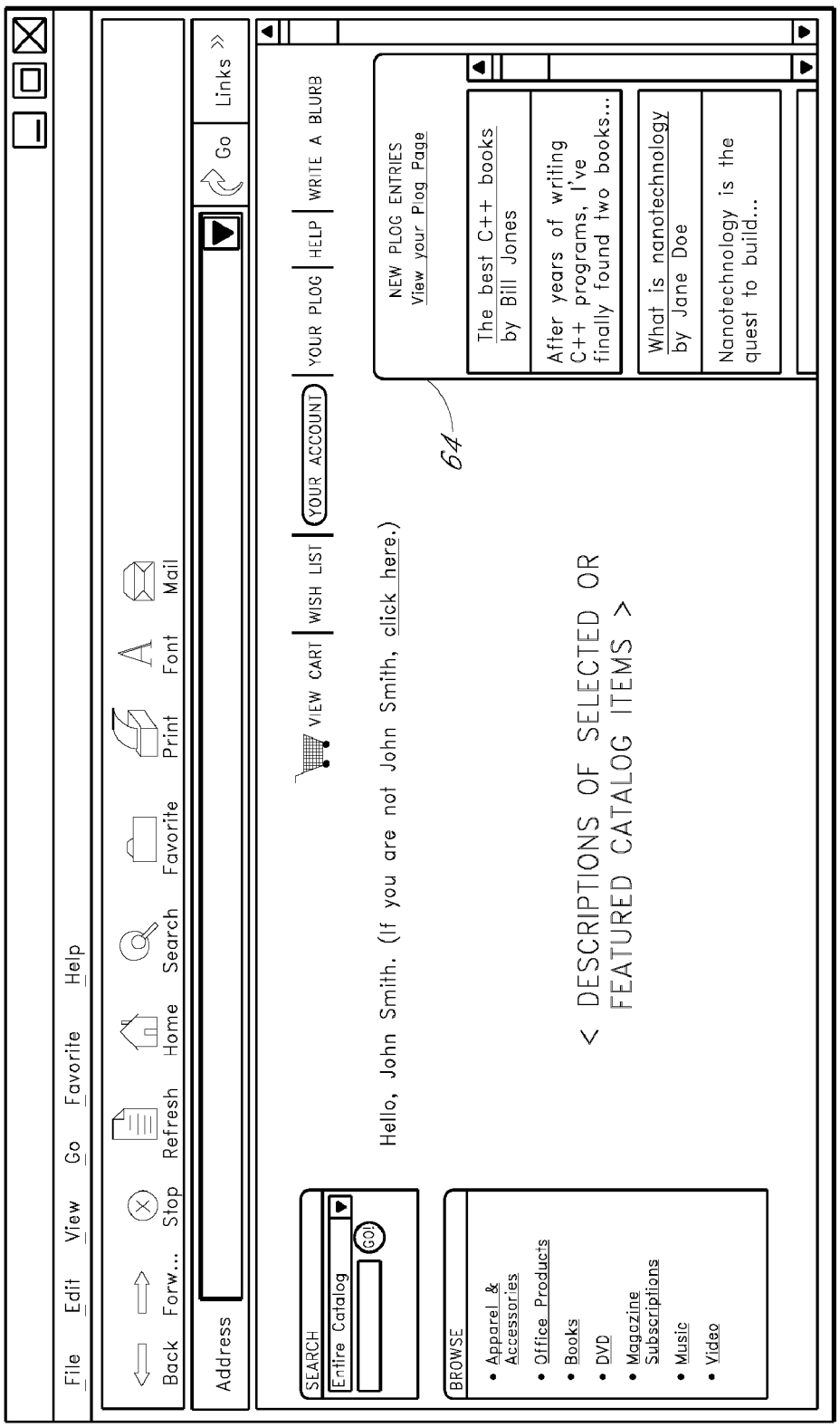
FIG. 5 depicts a personalized gateway page showing how new plog entries may be represented in a condensed form.

FIG. 5 illustrates an example home or "gateway" page as personalized for a particular user. The gateway page includes a "plogette" portion 64 that includes a condensed representation of the user's plog or of a most recent portion of the plog. The condensed representation preferably includes short excerpts of the plog entries most recently added to the user's plog (two shown), together with links to these entries. The gateway page may also be populated with descriptions of various items selected from the catalog.

As mentioned above, blurbs selected by the personalized blurb selection component 52 may also be presented on various other types of catalog pages, including browse node pages and item detail pages. In such instances, the context of the user's browsing session (e.g., the item or item category being viewed) may be taken into consideration in selecting blurbs to present.

III. Personalized Blurb Selection Algorithms

In one embodiment, blurbs are selected to inject into specific plogs using a plurality of competing blurb selection algorithms, each of which uses different selection criteria. The use of multiple competing selection algorithms tends to provide greater diversity of entries within each plog. Although the use of multiple competing selection algorithms is preferred, the blurbs may alternatively be selected, e.g., using a single selection algorithm, or by rotating among a set of alternative selection algorithms.

Figure 6:
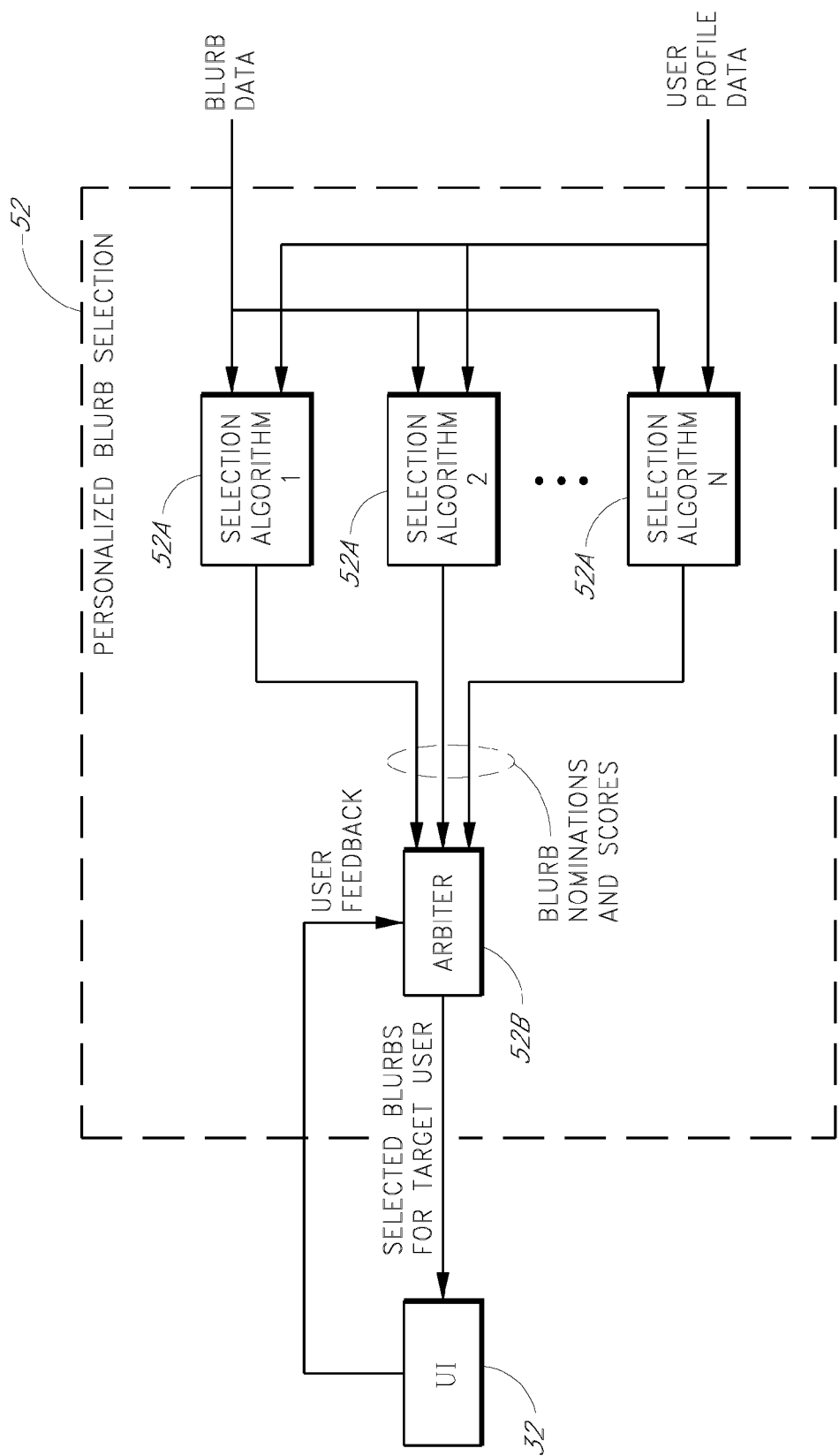
FIG. 6 illustrates a preferred embodiment of the personalized blurb selection component of FIG. 1.

FIG. 6 illustrates the general process by which newly created blurbs are selected to present to a specific user. Each of multiple blurb selection algorithms 52A uses its respective selection criteria to assign relevance scores to specific blurbs that have recently been added to the database 44. At least some of these algorithms take information about the target user into consideration in generating the relevance scores, although different selection algorithms may consider different elements or types of user preference data.

As illustrated, each selection algorithm 52A may nominate one or more blurbs to present to a given target user. An arbiter component 52B considers these nominations, including the associated relevance scores, and selects the blurbs that are ultimately to be added to the target user's plog or otherwise presented to the target user. As part of this process, the blog scores generated by the various selection algorithms 52A may be normalized and compared. The arbiter 52B may use a variety of different criteria to make the ultimate blurb selections. For example, to provide a degree of variation, the arbiter 52B may ensure that the target user sees blurbs nominated by each of the selection algorithms 52A, or may otherwise ensure that the target user's plog is not dominated by the nominations of any particular selection algorithm 52A. In addition, the arbiter 52B may give significantly greater weight to any blurb that was nominated by more than one selection algorithm 52A.

As depicted in FIG. 6, the arbiter 52B may also take into consideration the reader feedback that has been provided on each nominated blurb. In addition, the arbiter 52B may take into consideration the feedback provided by the particular user in connection with each selection algorithm 52A. For example, if the target user has consistently responded favorably to blurbs nominated by a particular selection algorithm 52A, the nominations of that selection algorithm may be selected more frequently for that particular target user.

Several examples of the types of blurb selection algorithms 52A that may be used are provided below.

Item-referencing blurbs by item selection history: This selection algorithm 52A nominates blurbs that reference catalog items that appear within the item selection history (e.g., purchase history or review submission history) of the target user. The algorithm may also nominate blurbs that reference items that are similar to items in the item selection history of the target user. To implement this algorithm, a global reverse index is periodically generated that maps referenced items, and items similar to such referenced items, to specific blurbs that refer to the referenced items. Each such mapping carries a strength, with direct-reference mappings carrying a greater weight than similar item mappings. To select or nominate blurbs for a target user, the reverse index is initially accessed to identify the item-to-blurb mappings that correspond to the user's selection history. If two or more of these mappings are to the same blurb, the weightings associated with these mappings are summed to generate a user-specific weight for that blurb. Finally, the blurbs with the highest weights are selected.

Reader/Writer Selection History Similarity: This selection algorithm 52A identifies internal blurb authors that have similar item selection histories to that of the target user, and nominates blurbs by such "similar authors." Conventional collaborative filtering algorithms may be used to identify the authors that are the most similar to the target user. In one embodiment, several hundred authors are selected based on selection history overlap and the age of each author's most recent blurb. The vote-based reputations of these authors are then considered in selecting specific blurbs to nominate. This algorithm is based on the assumption that blurb authors who selected catalog items similar to those selected by the target user are likely to author content that is interesting to the target user. A variation of this algorithm is to identify authors that have similar voting histories to that of the target user, and to nominate blurbs from these similar-voting authors.

Readers with similar selection histories liked it: This selection algorithm 52A selects blurbs that were liked by users having similar item selection histories to that of the target user, as reflected by explicit and/or implicit user feedback. This algorithm is preferably implemented using a mapping of specific blurbs to catalog items selected by readers of such blurbs, as depicted in Table 1. In one embodiment, each time a reader casts a positive or negative vote on a particular blurb, the associated mapping is updated to increase (if a positive vote) or decrease (if negative) the blurb-specific scores associated with each item in the reader's item selection history. For a given blurb, each item in the catalog can thus have a blurb-specific score that is positive, negative, or zero.

TABLE 1

|  | Item 1 | Item 2 | ... | Item N |
|---|---|---|---|---|
| Blurb 1: | 0 | 5 |  | −4 |
| Blurb 2: | 12 | −6 |  | 0 |
| . | . | . |  | . |
| . | . | . |  | . |
| . | . | . |  | . |
| Blurb N: | −2 | 5 |  | 0 |

To evaluate whether a candidate blurb should be nominated for a particular target user, the associated blurb-specific scores of those items appearing in the target user's selection history are summed to generate a blurb score. The blurb scores of all candidate blurbs are then considered in combination to select specific blurbs. Other criteria, such as the reputations of the authors of the candidate blurbs, may also be taken into consideration. This algorithm is based on the assumption that readers that have similar item selection histories will like similar blurbs.

This algorithm may also be used to personalize the selection of other types of content items, such as blogs, music files, product descriptions, or web sites. Further, rather than solely using explicit votes, the algorithm may additionally or alternatively use implicit votes on the blurb or other content item. For instance, when a user forwards a particular blurb to a friend or responds to the blurb by selecting the author's blog for viewing, the user may be deemed to have cast a favorable vote on the blurb. The algorithm may also be appropriately modified to rely solely on favorable votes, or possibly to rely solely on unfavorable votes.

Figure 7:
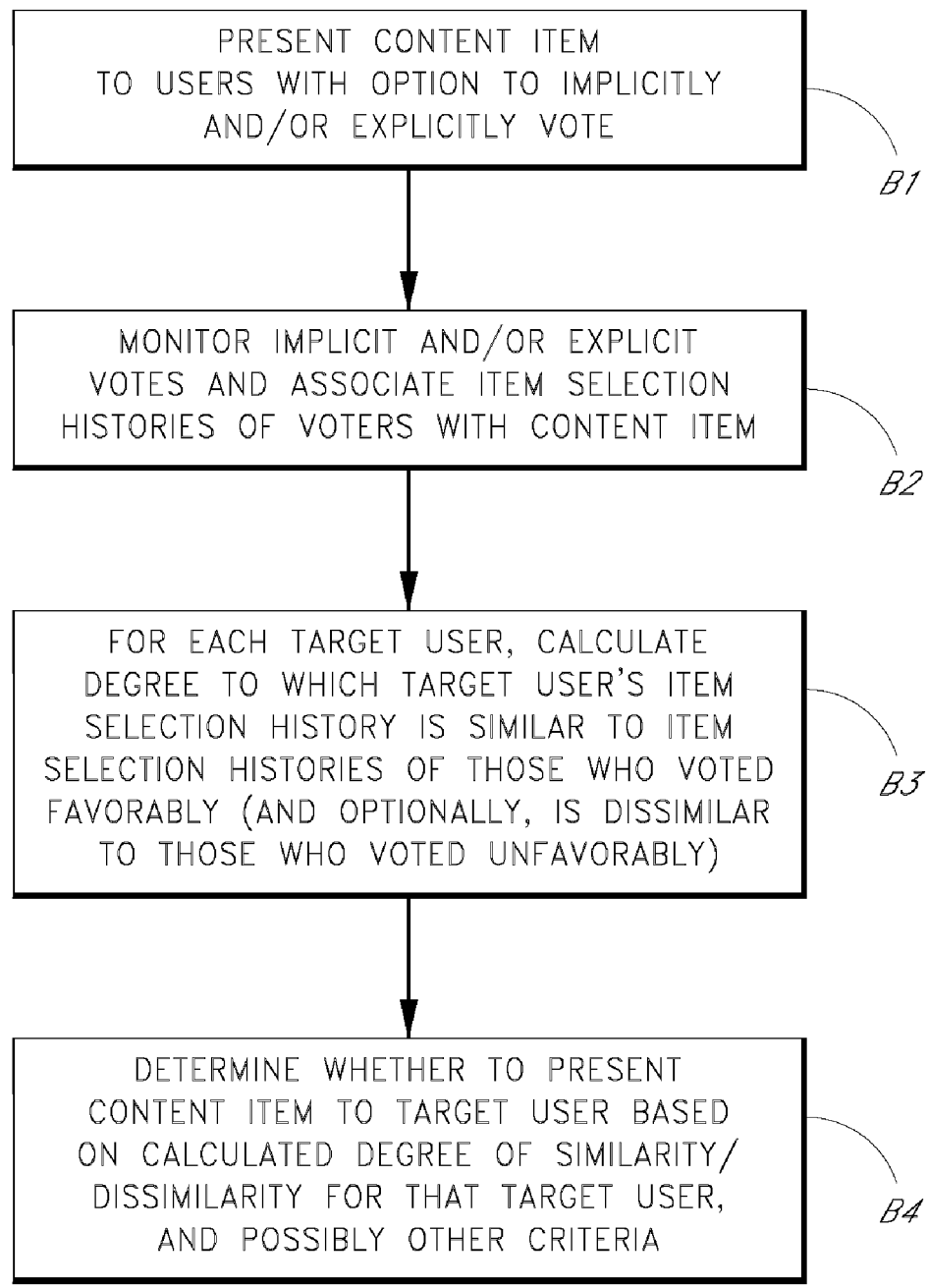
FIG. 7 illustrates the process flow associated with one method that may be used to personalize the selection of blurbs, and/or other types of content items, for specific users.

FIG. 7 illustrates the general process flow associated with this selection algorithm, as applied to a particular content item such as a blurb. As depicted in block B1, the content item is presented to users over time together with an option to explicitly and/or implicitly vote on the content item. As mentioned above, this option may, in some embodiments, consist of an option to implicitly or explicitly vote favorably, without any option to vote unfavorably. As depicted by block B2, the item selection histories of some or all of the voters are associated with the content item, such as by generating a mapping of the type shown in Table 1. The mapping may be updated as votes are cast, or may be generated periodically using previously-recorded votes. As depicted by block B3, to evaluate whether the content item should be presented to a particular target user, the degree of similarity between the target user's item selection history and the item selection histories of those who voted favorably on the content item is calculated. In embodiments in which unfavorable votes are recorded, the degree to which the target user's item selection history differs from those who voted unfavorably on the content item may also be considered, as is the case in the embodiment depicted by Table 1. Finally, as depicted by block B4, the calculated degree of similarity (and optionally dissimilarity) is used as at least one factor in deciding whether the content item should be presented to the target user.

Content-based: This blurb selection algorithm analyzes blurb content to search for blurbs that are related to the item and/or category preferences of the target user. Author reputations may also be taken into consideration.

Weighted random: This selection algorithm weights blurbs based on freshness and/or author reputation, then selects specific blurbs to nominate using a weighted random selection algorithm.

For the above and other blurb selection algorithms that rely on the item selection histories of users, different types of item selection histories may be used to achieve different results. For example, to identify blurbs that correspond closely to the target user's current browsing session, an item selection history consisting only of those items viewed during the current session may be used. In addition, although the system 30 may keep track of many different types of item selection actions (detail page views, purchases, review submissions, etc.), the blurbs may be selected using item selection histories that reflect only a subset of these monitored actions (e.g., purchases only).

In addition, rather than scoring and evaluating individual blurbs as described above, the system 30 may seek to identify entire blogs that are of interest to the target user. Once the most relevant blogs have been identified for a target user, the most recent entries within such blogs may be selected to present to the user. Selection algorithms similar to those described above may be used to select the most relevant blogs.

IV. Example Web Site Architecture

FIG. 8 illustrates one example of a web site architecture that may be used to implement the system 30 of FIG. 1. In this embodiment, the system includes a web server component 70 that communicates with various service applications, including a catalog service application 72, a blurbs service application 74 and a user accounts service application 76. Numerous other service applications may be provided for handling such tasks as authenticating users, processing orders, generating personalized item recommendations, etc. An RSS feed component 86 is also provided in this example for populating the blurbs database 44 with blurbs obtained from external sources, such as other web sites. The RSS feed component 86 preferably performs the aforementioned tasks of locating new RSS pages, periodically checking known RSS pages for new entries, and adding new entries to the database 44 as external blurbs.

The web server 70 includes or communicates with a template processor 80 that accesses a database 82 of web page templates. These templates specify the basic layout of the author pipeline pages (FIGS. 2 and 3), plog pages (FIG. 4), gateway pages (FIG. 5), item detail pages, and various other web pages of the web site. The templates also specify service calls that are to be made to populate requested web pages and to make updates to various databases.

The catalog service application 72 is generally responsible for providing the catalog content displayed throughout the various web pages of the site, as maintained in the item descriptions database 34 and possibly other databases. The blurbs service application 74 is generally responsible for handling blurb submissions and votes, responding to requests from the web server 70 for blurb content, and notifying the user accounts service 76 of events that affect the profiles of specific users. The above-described functionality for personalizing the selection of blurbs may also be included in this service component 74. The users accounts service application 76 is generally responsible for responding to requests for user account information (including item selection histories, vote and reputation data, etc.), and for updating the profiles of users in response to certain types of events. A "user" may generally be an individual, or a group of individuals that share a common computer or account.

In the embodiment shown in FIG. 8, the electronic catalog system 30 also includes a creator management system 90. As described in the following subsections, this system 90 provides functionality for enabling creators of works, such as authors of books, to set up special verified accounts through which they can post content in connection with their respective works. The creator generated content posted via this system 90 is sent via the web server 70 to the blurbs service application 74, which handles these postings as a special type of blurb. As will be apparent, this feature of the system can be implemented either with or without the use of the personalize blurb selection algorithms described above.

The various application components shown in FIG. 8 may, for example, run on general purpose computers that are interconnected on a local area network. Each component may be implemented as a collection of software modules stored in hard disk storage or any other type of computer storage device.

V. Postings by Creators of Specific Catalog Items

Another feature that may be embodied in the electronic catalog system 30 will now be described with reference to FIGS. 8-15. Briefly, this feature enables users who are "creators" of particular works represented in the electronic catalog to securely post blurbs in association with such works. (The term "creator," as used herein, is intended to encompass any entity that creates or contributes to the creation of a work, including, for example, an author of a book, a person who is the subject of a biography, a musical group or artist associated with a musical work, or an actor, director or writer of a movie title.) For example, an author of a particular book may use this feature to post a blurb that is specific to this book, and to create an association between this blurb and the catalog description of the book. The system 30 may thereafter display the blurb on the book's detail page (see FIG. 10, discussed below) with an indication that the blurb is from the book's author. As with blurbs generated by other classes of users, the system may also display the blurbs generated by a particular creator on a publicly-accessible blog page of the creator (see FIG. 11).

The system may also provide special functionality for inserting these "creator-generated" blurbs into the plogs of particular users. For example, a user who purchases a particular work via the system 30 may automatically receive, in his or her plog, all subsequent blurbs generated by the work's creator(s), or all such blurbs that are specifically attached to this work. As another example, the system 30 may provide a subscription option through which a user can subscribe to the blog of a particular creator, or to the creator's blurb "stream" associated with a particular work or collection of works. The system may also provide each user the ability to block posts from a particular creator from being added to the user's plog.

Example web pages through which creators (and more particularly, authors of books) post blurbs in association with their books, and through which users can access such blurbs, will initially be described with reference to FIGS. 9 to 12. A verification process through which the system 30 can efficiently and reliably authenticate such creators, and associate their log-in credentials with their respective works, will then be described with reference to FIGS. 13-15. Although the figures and following description focus primarily on use cases involving authors of books, the disclosed methods are also applicable to other types of creators of works.

V-A. Posting and Display of Content

FIGS. 9-12 are example screen displays (web pages) showing how an author of one or more books can post a blurb, and how the system 30 may display the posted blurb on various types of web pages. The process depicted by these web pages may also be used for creators of other types of works (e.g., movie titles, music titles, etc.). It is assumed in the example depicted by these screen displays that the author has already completed an appropriate author verification process, such as the process of FIG. 13 or FIG. 14, discussed below.

As a preliminary matter, it should be noted that the term "author" is used in this discussion to refer primarily to authorship of a book; in contrast, the term was used in preceding sections to refer primarily to authorship of blurbs.

Figure 9:
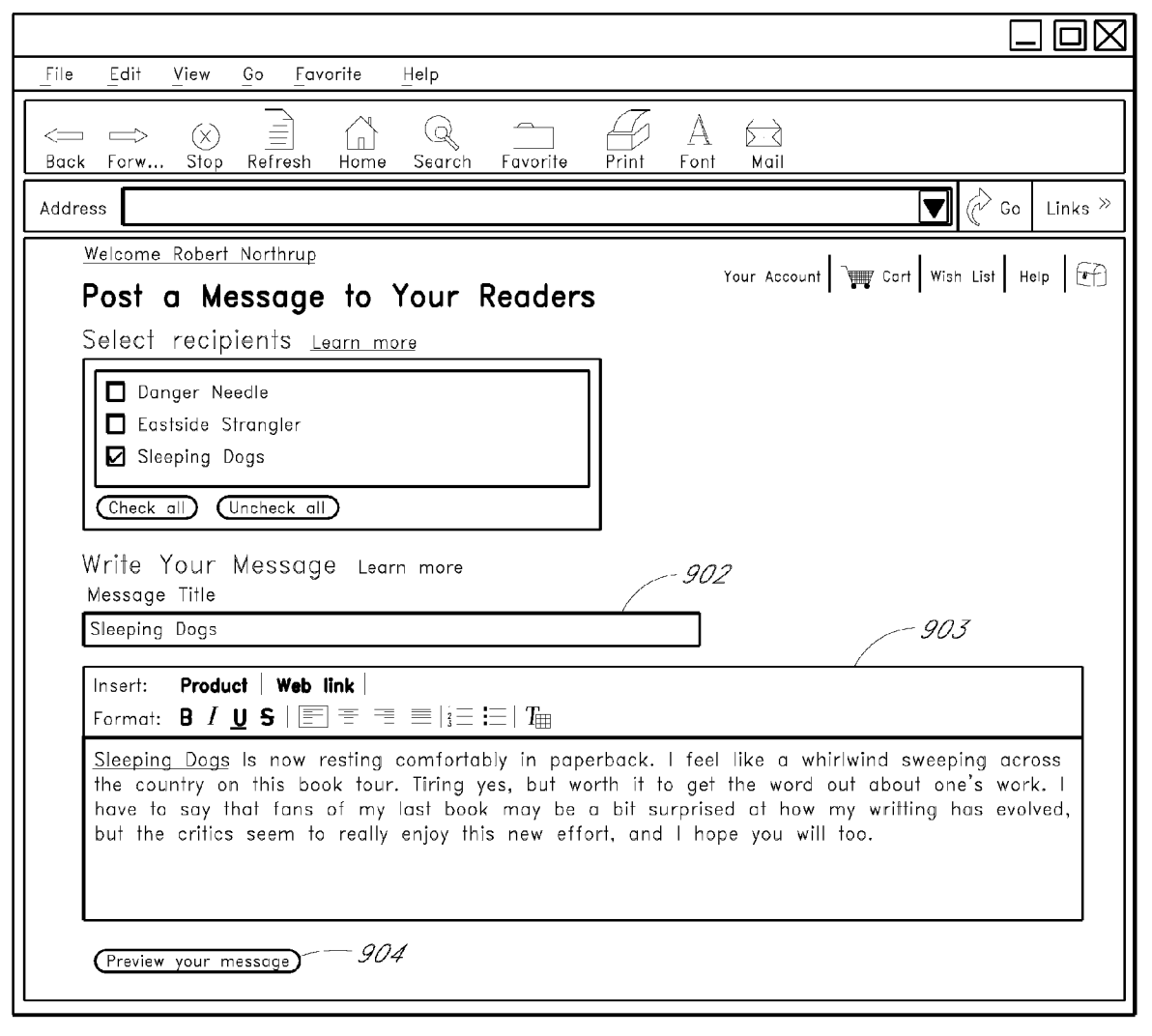

FIG. 9 illustrates an example blurb entry page that is accessible to creators, and particularly book authors, that have been verified as such. The web page is shown as it may be personalized for a particular author, Robert Northrup. The blurb entries shown in this and the other figures are hypothetical messages provided merely for purposes of illustration. The page is generally similar to the blurb entry page of FIG. 2, but provides additional functionality that is exposed only to verified creators.

As illustrated in FIG. 9, the blurb entry page lists the items (book titles) represented in the electronic catalog for which this particular user has been verified as the author. Each book title is displayed with a corresponding check box that can be selected to cause the newly created blurb to be associated with, or "attached to," that book title. If the author opts to attach the blurb to a particular book title, the blurb is displayed on the book's detail page in the electronic catalog (see FIG. 10). The blurb-book associations specified by the author in this manner may also be used by the personalized blurb selection component 52 (FIG. 1) to select the blurb for insertion into the plogs of particular users. The author is also presented with a checkbox for indicating whether the blurb is to be added to his blog.

The web page in FIG. 9 also includes areas for entering the headline 902 and body 903 of the blurb. As with blurbs posted by non-creator users, the author has the ability to add links to specific items in the catalog, and is provided with a tool for doing so. The author can also insert links to other web sites. Once the blurb text has been entered, the creator may select the "preview" button 904 to view a preview of the blurb (not shown), and to confirm that the blurb is to be posted. Although not shown in FIG. 9, the blurb entry page may also provide an option for the author to save a draft of the blurb for subsequent retrieval.

Upon confirming the posting, the blurb is added to blurbs database 44 (FIG. 1), together with associated metadata such as the submission date, an ID of the verified author, and the IDs of any book titles to which the blurb is attached. The personalized blurb selection component 52 may use this metadata to select the blurb for insertion into the plogs of particular target users, such as those who have subscribed to this author's postings or have purchased one or more of his books. The creator-generated blurb may alternatively be targeted to these users via another method, such as by email, or by presentation on a personalized home/gateway page of the electronic catalog system 30.

In one embodiment, creator-generated blurbs are only selected based on algorithms written specifically for these types of blurbs, and not by the "general-purpose" blurb selection algorithms described in section III. In another embodiment, the creator-generator blurbs are selected to present to users using both the general-purpose algorithms described in section III, and using additional methods that are specific to creator-generated blurbs.

Figure 10:
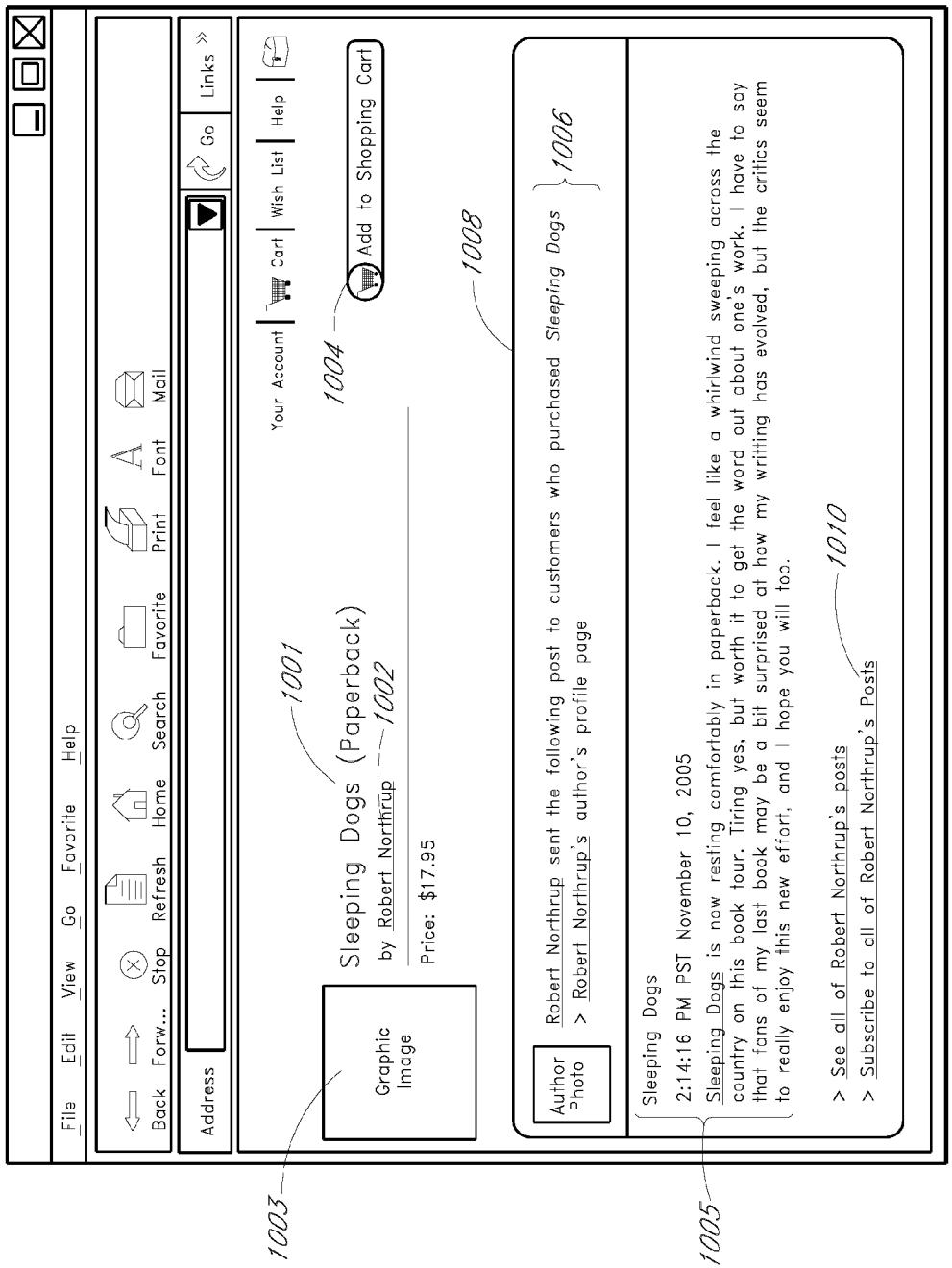
FIG. 10 illustrates an example book detail page that displays a blurb posted by the book's author.

FIG. 10 shows how the newly posted blurb may be displayed on a publicly-accessible item detail page of a book title selected by the author in FIG. 9. In addition to the standard information included on book detail pages (e.g., the book's title 1001, author 1002, cover art 1003, and price; and an "add to shopping cart" button 1004), the detail page includes all of the author's blurb postings 1005 (one shown) that are attached to this particular book title. The blurb 2005 is displayed together with a non-creator-supplied message 1006 that attributes the blurb to the book's author, and which includes a link to the author's profile page (see FIG. 12). If the system 30 supports the ability for ordinary users to post customer reviews to item detail pages, the creator-supplied blurb 2005 is preferably displayed on the detail page in a dedicated area 1008 that is separate and distinct from the area used to display customer reviews.

As illustrated at the bottom of FIG. 10, the detail page also includes a link labeled "see all of Robert Northrup's posts" that can be selected to view additional posts that are not attached to this book title. In addition, the detail page includes a link 1010 that is selectable by users to subscribe to future postings by this author. In one embodiment, those who subscribe automatically receive any such postings in their respective plogs; in addition, those who purchase the book automatically receive posts that the author attaches to this book.

FIG. 11 illustrates how the newly posted blurb may be displayed on the author's publicly accessible blog page. As illustrated, the blog page displays the name of the author, and includes links to the book detail pages of each of the author's books for which the author has completed the verification process. The newly posted blurb 1102 is displayed as a dated entry within a chronological log of blog entries (one entry shown). The page also includes a button 1105 that can be selected by a user to subscribe to this blog. If a user selects this option, the system 30 will automatically add any future blog entries posted by this author to the user's plog—regardless of whether such postings are attached to any particular book title. If a user who accesses this web page is already subscribed to the blog, the web server 70 may replace this button 1105 with one or more buttons for changing the subscription settings and/or cancelling the subscription.

In the particular example shown in FIG. 11, the blog page is illustrated as personalized for this author, and thus includes additional elements that would not be displayed to other users. Specifically, the page includes a button 1004 for posting a new message to the blog. In addition, the page includes an "edit your profile" link for editing the displayed author profile, and includes an "edit this post" link for making changes to the displayed blog entry 1002.

Figure 12:
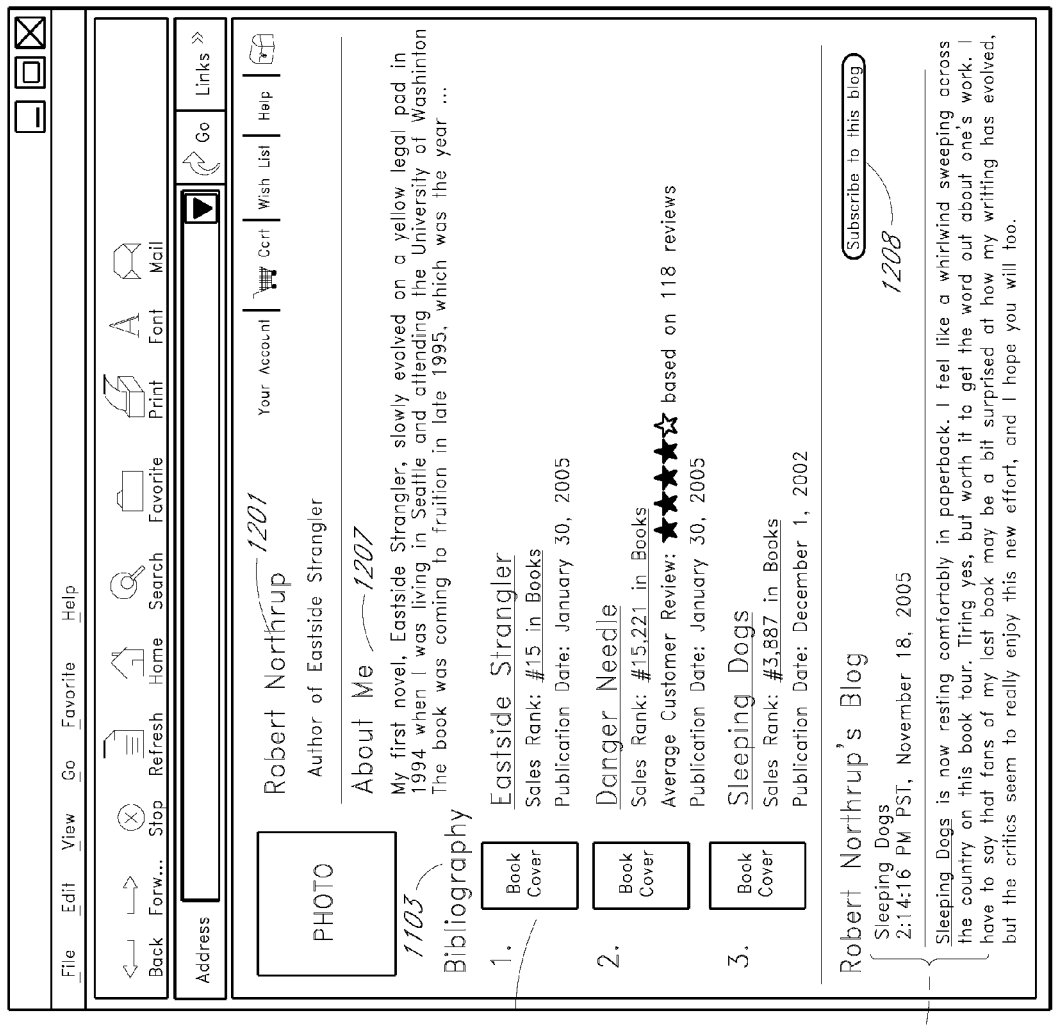
FIG. 12 illustrates an example personal profile page of a verified author of books.

In addition to appearing on the creator's blog page, the blurb also preferably appears on the creator's publicly accessible profile page, as shown in FIG. 12. This page may be accessed by clicking on the author's name on various other types of pages, such as those shown in FIGS. 10 and 11. Similar to the creator blog page shown in FIG. 11, the creator profile page displays the author's name 1201, blog entries 1202 (one shown), profile 1207, and verified book titles. The book titles in this example are displayed with associated details, including sales rank and release date. The page also includes a button 1108 for subscribing to the author's blog.

The screen displays of FIGS. 10-12 are intended as examples of particular ways in which the creator-generated postings can be published to users of the electronic catalog. In other embodiments, the postings may additionally or alternatively be displayed on other types of pages.

V-B. Author/Creator Verification

Two separate processes will now be described for "verifying" the email addresses and login credentials of creators of particular works, and for associating the access credentials (e.g., username and password) of such users with their particular works or items represented in the electronic catalog. Both of the disclosed verification processes may be used by the system 30, and both may be embodied in the creator management system 90 depicted in FIG. 8. One purpose of these processes is to ensure that only one who is actually a creator of a work will be able to post a blurb that is displayed on the work's detail page, and that is displayed with attribution to the work's creator.

By way of background, the electronic catalog typically includes information about works from many tens of thousands to millions of different creators (authors, musical artists, etc.), many of which are not well known. Ideally, a significant portion of these creators will set up special accounts that enable them to post content in connection with their respective works. However, the task of locating and contacting these creators, and verifying their email addresses and/or other access credentials, can be prohibitively burdensome for an operator of an electronic catalog system. The verification processes described below address this problem by automating portions of the verification process, significantly reducing the need for human intervention on the part of the system operator.

Both verification processes involve the use of a third party verifier, such as a publisher (in the case of authors), a recording company (in the case of musical artists and groups), or a motion picture studio (in the case of creators of movie titles), to verify the creator's email address and authorship/creatorship. Many such third party verifiers may be used, each of which may be capable of verifying many different creators. As illustrated in FIG. 8, information about the third party verifiers (email addresses, phone numbers, etc.) that are authorized or "trusted" to provide verification services is stored in a database 94 that is accessed by the creator management system 90.

Figure 13:
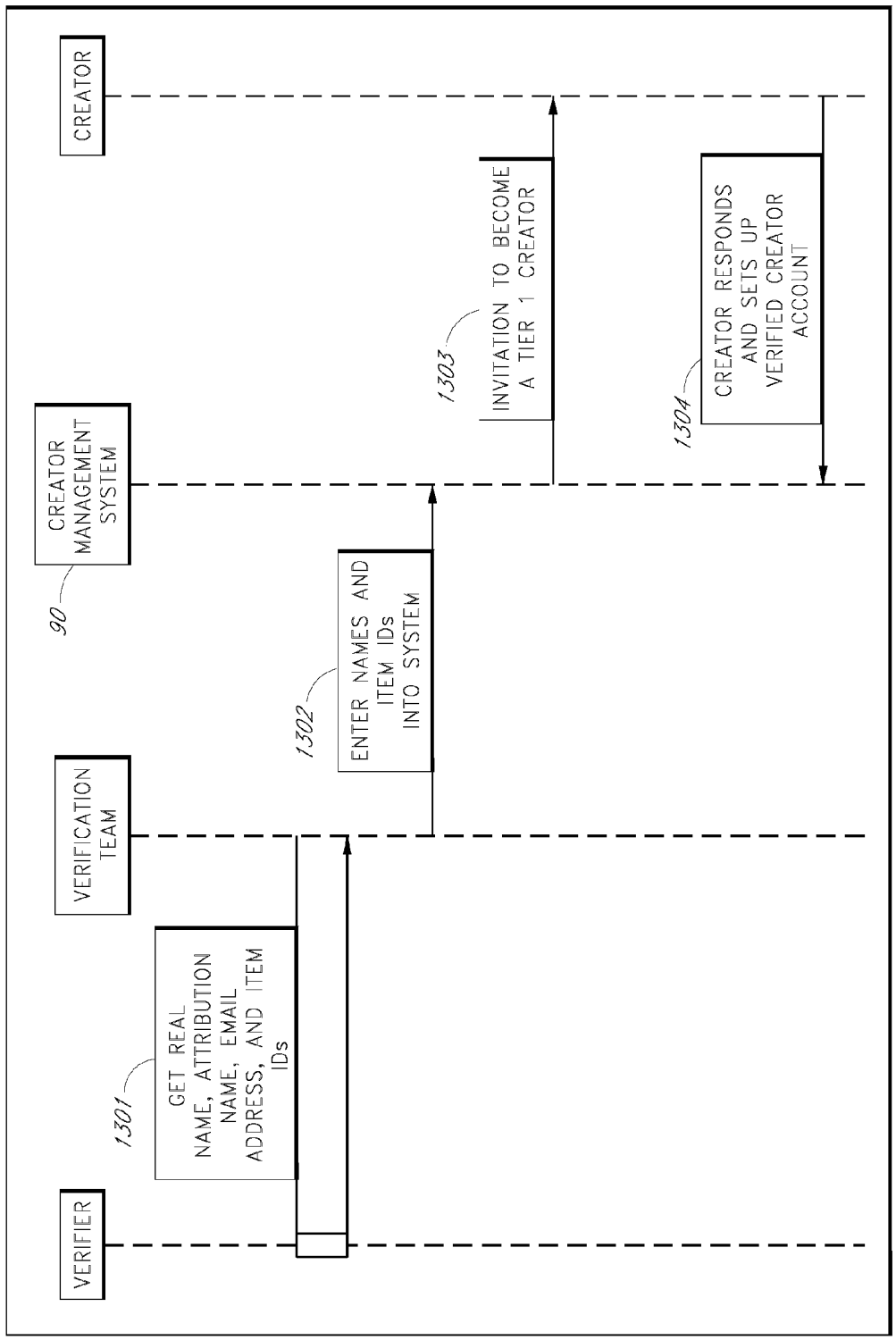
FIG. 13 illustrates one embodiment of a creator verification process.

FIG. 13 illustrates the first of the two verification processes. This process may, for example, be used to verify a relatively small number of well known creators, while the process shown in FIG. 14 may be used to verify the relatively large number of creators that are not well known. The human or business entities involved in these processes are the creator (which is typically a human, but may be another type of entity such as a musical group), a third party verifier associated with the creator (e.g., the creator's publishing company, agent or publicist), and a verification team. The verification team typically consists of one or more individuals employed by the operator of the system 30 for purposes of signing up new creators and verifying their access credentials. Alternatively, the verification team may be an automated system that is configured to verify the creator or a third party associated with the creator.

The process shown in FIG. 13 is initiated by the verification team for purposes of verifying a particular creator, such as a well known author of a particular book or collection of books. Specifically, in step 1301, the verification team contacts a verifier known to be associated with this particular creator (by email, telephone, facsimile, an in-person meeting, or any other method), and requests specific information about the creator. The requested information preferably includes the creator's email address, and may also include one or more of the following: (a) identifiers, such as ISBN numbers, of the works created by this creator; and (b) the creator's real name if the creator uses an attributed name (e.g., as in the case of Samuel Clemens, which used the attributed name Mark Twain).

In step 1302 of FIG. 13, the verification team enters the creator's real name, attributed name (if any), email addresses, and item/work identifiers into the creator management system 90. As an alternative to having the verification team enter this information into the system, the verifier may be securely presented with a web form, or another type of electronic form, for directly entering this information into the creator management system 90. In either case, the verified email address is used by the system 90 to set up a special type of verified account, referred to herein as a creator account, that enables the creator to post content as described above.

In some embodiments, the creator management system 90 may include a field for specifying the creatorship role or roles of each creator. Valid roles may include, for example, author, co-author, illustrator, novelist, biographer, biography subject, editor, director, producer, actor, musical artist, musical group, and/or composer. Where multiple different role types are supported, the verification team or the verifier may enter into the creator management system 90 the appropriate role or roles of this creator.

In step 1303, the creator management system 90 automatically sends an email message to the verified creator's email address inviting the creator to set up or begin using the creator account. The email may include an encoded invitation link that can be selected by the recipient to access an account setup page or pipeline of the system. To provide security, the link may be a secure, one-time-use link that includes a unique, pseudo-random (and/or encrypted) string or token that is difficult to guess, as described, for example, in U.S. Pat. No. 6,360,254, the disclosure of which is hereby incorporated by reference. If the verified email address is already associated with a valid user account that is not set up as a creator account, the creator management system 90 may alternatively convert this account into a creator account, or invite the creator by email to so.

In step 1304, the creator clicks on the invitation link in the email message, or otherwise follows the instructions contained therein, and is taken to a personalized creator-account setup area of the web site. The creator's email address will at this point be considered verified. If the creator already has a pre-existing account with the system, and this pre-existing account is associated with the verified email address, the pre-existing account may be enabled as the creator account at this point. Otherwise, the creator may be asked to specify a password, username/password pair, or other access information for accessing the creator account. The creator-account setup area may also provide functionality for the creator to, for example, upload a personal photo, supply a creator profile, supply a different email address, begin to post blurbs, etc.

Once the creator completes this process, the creator and the associated account are said to be verified, and a secure communications channel is deemed to exist between the verified creator and system 30. Thereafter, when the creator logs in to the creator account, the system presents enhanced functionality for posting content, such as the blurb posting page shown in FIG. 9. The type of functionality presented may depend upon the role type of the particular creator. As one example, a creator having the role of "musical group," or "musical artist" may be given the option to post short music files with samples of upcoming songs. As another example, authors of books may be presented with the option to post PDF or e-book files with, for example, short literary works, alternative endings to existing books, etc. The "creator" status of a given user account may be recorded in the user profiles database 38 (FIG. 8), or in any other data repository.

Figure 14:
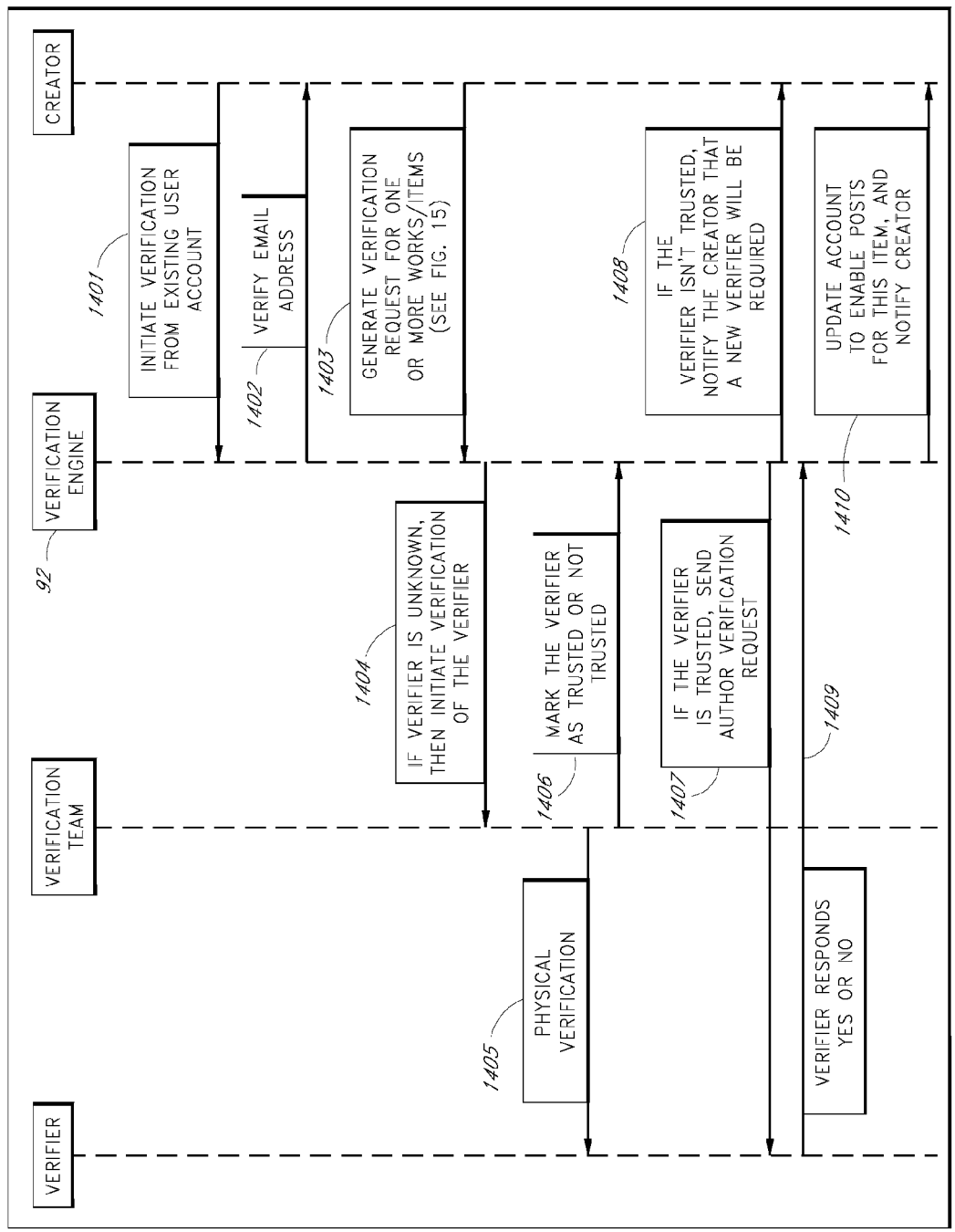
FIG. 14 illustrates another embodiment of a creator verification process.

FIG. 14 illustrates an embodiment in which the creator, rather than a verification team, initiates the verification process. As mentioned above, this process may be used for verifying authors and/or other creators who are not yet well known. This process makes use of a verification engine 92 (FIGS. 8 and 14) that automates the process of communicating with the creator and the verifier. It is assumed in this example that the creator already has an existing access account with the system 30, and that this account is associated with an email address of the creator and a password.

In step 1401, the creator initiates the verification process from a web page of the electronic catalog system 30. The creator may be required to log into the existing account before initiating this process. In step 1402, the verification engine 92 responds by sending an email message to the email address on record in order to verify that this email address corresponds to the user who initiated the verification process. The email message may contain a secure link (e.g., generated as described in U.S. Pat. No. 6,360,254) that allows the creator to confirm the email address and continue the verification process, or may simply instruct the creator to access his or her account to continue with the process.

Figure 15:
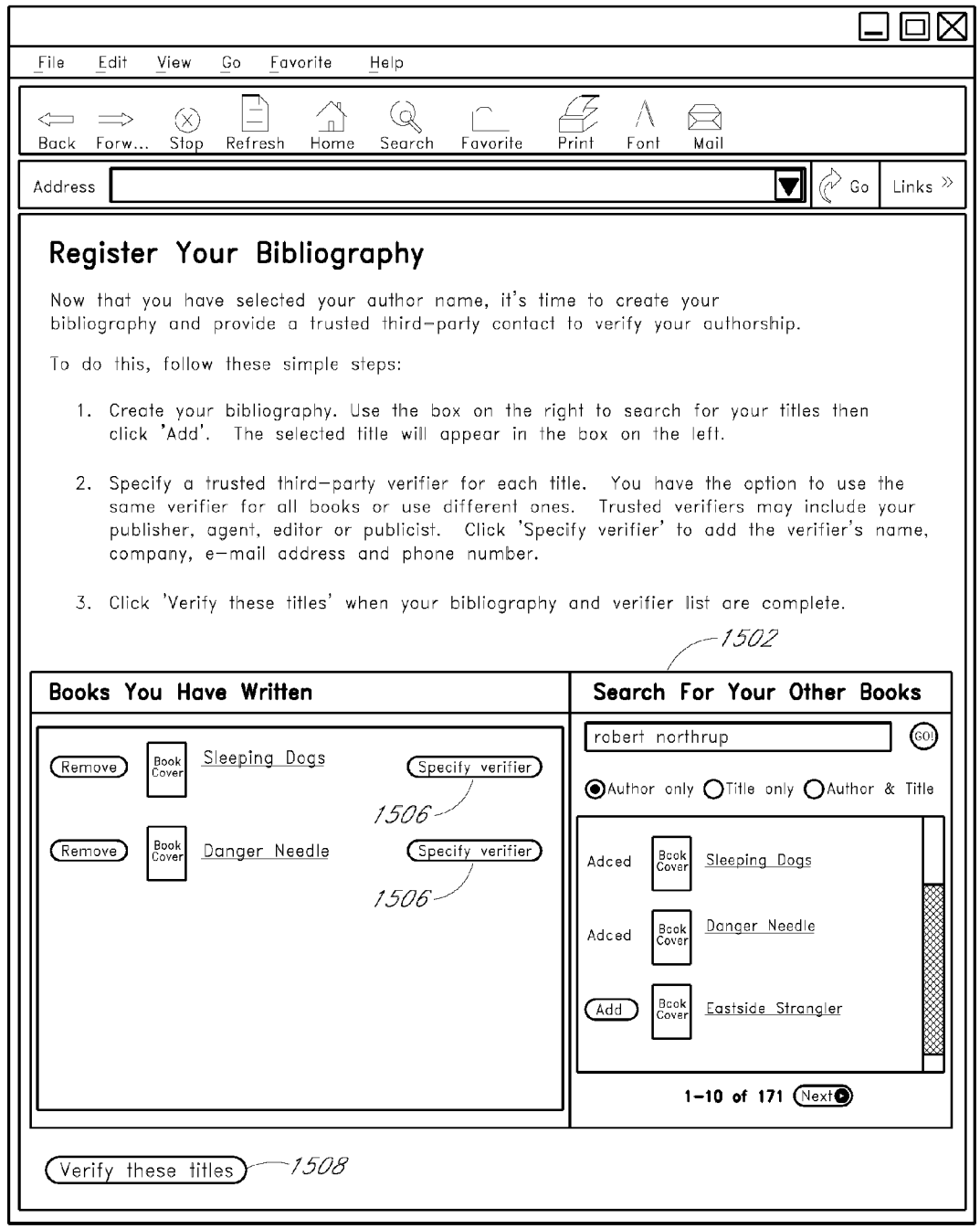
FIG. 15 illustrates a form page that may be used by an author of books as part of the process shown in FIG. 14.

Upon accessing the system 30 in response to the email (e.g., by selecting the secure link), the creator enters into a pipeline in which the creator is asked to supply information for generating an automated verification request to one or more third party verifiers. FIG. 15 illustrates one example of a web form that may be presented for this purpose in the context of books. Prior to accessing this web form, the author is asked to supply an author name, which may be different than the user's actual or account name if the author uses a fictitious name for authorship.

In the example shown in FIG. 15, the web form includes a search box 1502 that can be used to interactively search for particular book titles. Book titles located via the search box 1502 can be added to a "books you have written" box 1504 using the corresponding "add" buttons. For each added book title, the author/creator can select a corresponding "specify verifier" button 1506, which brings up a verifier form (not shown) for entering information about a corresponding verifier. The verifier form may, for example, request the following information: verifier type (e.g., agent, editor, publisher, or publicist); verifier name, verifier company; verifier email address; verifier phone number. Different verifiers may be specified for different book titles, as may be desirable where, for example, the author has worked with different publishers on different books. If the author has successfully used the creator management system 90 before for one or more different works, the author may also be presented with an option to select a previously-used verifier. Once the author has designated a verifier for at least one book title, a "verify these titles" 1508 may be selected to submit a verification request to the system 30.

The submission of the verification request is represented in FIG. 14 as step 1403. Next, for each designated verifier, the verification engine 92 checks the database of trusted verifiers 94 (FIG. 8) to determine whether the verifier is trusted. If the verifier is not found in the trusted verifier database 92, then in step 1404, the verification engine 92 notifies the verification team that this verifier needs to be verified. In step 1405, the team attempts to contact the verifier (e.g., by phone, in person, etc.) to determine if the verifier information is correct and if the verifier can be trusted. After contacting the verifier, the team determines whether or not to deem the verifier as trustworthy, and updates the creator management system 90 accordingly in step 1406. If the verifier is deemed untrustworthy, the verification engine 92 in step 1408 notifies the creator by email that verifier could not be verified, and invites the creator to provide a different verifier.

If a verifier is deemed trustworthy, then in step 1407 the verification engine 92 sends the verifier an author verification request (or more generally, a creator verification request), which may be transmitted by email, a custom web page, or a combination thereof. The author verification request asks the verifier to verify the email address of the creator—by presenting the email address on record to the verifier and requesting confirmation of its accuracy, and/or by requesting the verifier to supply an email address of the creator. For example, in one embodiment, the verifier is asked the question "is <email address> the email address of <creator name>?", and is prompted to select one of the following four responses: (1) "yes;" (2) "I do not know, but I do know that he/she uses the following email address: [field for verifier entry of email address];" (3) "I do not know if this is the email address of <creator name>;" or (4) "I am not affiliated with <creator name> and cannot verify his/her authorship." (Note that <email address> and <creator name> are replaced with an actual email address and name in the above messaging.) The verification request may also prompt the verifier to confirm or specify the role of the purported creator in connection with each work designated for this verifier. For example, in the case of books, the author verification request may list each book title, and prompt the verifier to indicate whether the person claiming to be the book's author is actually the author.

In one embodiment, the author verification request comprises an email message that is sent to the verifier. This email message may include a secure link that is selectable by the verifier to securely access a web form (or sequence of forms) for reviewing, editing and confirming information for this creator, and/or may include a secure link that is selectable to immediately confirm the creator information included in the email. Because the verifier preferably interacts directly with the creator management system 90 in this step 1409 (e.g., via one or more web pages), no involvement of the verification team is required. All of the verifier's responses are recorded by the creator management system 90.

If verification is successful, the access rights associated with the creator's account are automatically updated by the verification engine 92 to enable creator-generated blurbs to be posted for the relevant work or works. Such access rights updates are represented in FIG. 8 by the arrow connecting the creator management system 90 to the user profiles database 38.

In step 1410, the creator is notified by email that the verification process has been completed successfully (or unsuccessfully). Steps 1404-1410 may be repeated or duplicated for each of the verifiers designated by the creator in step 1403. Until the creator has been verified for at least one item/work, the system 30 does not expose the recipient selection option in the blurb posting form of FIG. 9, and the creator thus cannot use the account to post blurbs that are treated as creator-generated blurbs.

As will be apparent, the verification process shown in FIG. 14 can be varied in a number of ways. For example, in the context of books, the author may alternatively be prompted to specify a single verifier, which may be used to verify the author's name and email address only. Once the email address has been verified, the author may be given access rights for posting content in association with any book title for which his or her name matches the author name listed in the electronic catalog, but may be asked not to post content in association with books authored by others having the same name.

The creator submission and verification processes described above may also be used in connection with associating a celebrity, personality, or other individual or entity with an item available in the electronic catalog. For example, an actress that is a spokeswoman or is otherwise associated with a cosmetic line may be verified to post blurbs to be associated with catalog items in that cosmetic line. As another example, the producer of the cartoon series Dora the Explorer may be verified/authorized to posts blurbs that purport to come from Dora, and to attach these blurbs to products associated with the cartoon.

VI. Author Verification for Book Scanning Applications

The verification processes described in the preceding subsection may also be used in connection with a book scanning project. By way of background, some search engine entities scan in the texts of large numbers of physical books, journals, and other printed publications, and apply OCR (Optical Character Recognition) to the scanned texts to make these publications searchable via the Internet. Due to the heavy burden associated with locating and contacting the authors of these publications, these search engine/scanning entities commonly refrain from seeking permission from the authors before making their works publicly searchable.

To address this problem, the above-described verification processes may be used to establish secure communication channels with particular authors whose books have been scanned or are candidates to be scanned. Once a given author has been verified via the system 30 in connection with a particular book (or other printed publication), the author may be presented with a web page that gives the author the option to grant or deny permission to the search engine/scanning entity to make the work searchable via the Internet. (Where the copyrights are owned by the book's publisher or another entity, the permission may alternatively be sought from that entity.) The granting entity may also be able to specify how much of the work (e.g., "no more than 10 consecutive lines") is to be made viewable to users via the Internet search engine. The system may be automated in the sense that the permission or permission level designated by the granting entity automatically controls the type or level of access users have to the scanned work via the search engine.

The system 30 may also enable the granting entity to make the permission grant contingent upon the search engine entity performing or agreeing to perform some action. For example, the author or other granting entity may agree to make his or her (or its) work publicly accessible or searchable provided that the search engine is configured to display a "pay box" of the granting entity on any web page that includes the text of the book or books. This pay box may enable search engine users to make voluntary payments to the author, as described in U.S. Patent Pub. No. 2002/0120567, the disclosure of which is hereby incorporated by reference. For example, when a search results page is displayed that contains a portion of a book from the author Robert Northrup, the search results page may include a pay box or link that reads "click here to make a voluntary contribution of $1 to Robert Northrup." Rather than displaying a pay box, the granting entity may, for example, require the search engine to display a link to a corresponding book detail page that enables users to purchase a copy of the book.

The foregoing model may also be used in connection with music downloads. For example, once the system 30 has verified a particular musical artist in connection with a particular work, the system may give the artist an option to make the work freely downloadable via the system. As with scanned books, the artist may grant this permission under the condition that the artist's pay box is published in connection with the download link.

VII. Conclusion

All of the functions and features described above may be implemented via software modules executed by one or more general purpose computers. These software modules may be stored in any type of computer storage medium or device. Various combinations of the disclosed features are possible within a given system, and all feasible combinations and subsets of the disclosed features are intended to be supported by this disclosure.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

What is claimed is:

1. A method, comprising:

providing a browsable electronic catalog via a server system, said electronic catalog comprising representations of works created by creators;

providing, via the server system, a creator verification user interface;

receiving, at the server system, a creator verification request from a user with the creator verification user interface, said creator verification request identifying a work selected by the user from the electronic catalog, and identifying a third party verifier for verifying that the user is a creator of the selected work, said third party verifier designated by the user via the creator verification user interface;

in response to the creator verification request, sending, from the server system, a request for the third party verifier to verify that the user is a creator of the selected work;

receiving, at the server system, from the third party verifier, a reply indicating that the user is a creator of the selected work;

in response to the reply indicating that the user is a creator of the selected work, exposing to the user, via the server system, a content submission interface;

receiving content from the user via the content submission interface; and in response to receiving the content, incorporating, by the server system, the content into a page of the electronic catalog together with a designation that the content is from a creator of the work, said page being associated with the work.

2. The method of claim 1, wherein the request for the third party verifier to verify that the user is a creator of the selected work comprises a request for the third party verifier to verify an email address of the creator of the work.

3. The method of claim 1, wherein the request for the third party verifier comprises a request for the third party verifier to supply an email address of the creator of the work.

4. The method of claim 1, wherein exposing the content submission interface to the user comprises modifying an account setting of an existing account of the user to grant access rights to the user to post content to the electronic catalog as a verified creator of the work.

5. The method of claim 1, wherein the request for the third party verifier is sent in further response to an automated determination that the third party verifier designated by the user has been verified.

6. The method of claim 1, wherein the method comprises receiving and processing the creator verification request by execution, on said server system, of program code of said creator verification user interface.

7. The method of claim 1, further comprising providing on said page, in association with the content, a user option to subscribe to future postings from the creator of the work.

8. The method of claim 1, further comprising, by said server system, automatically communicating the content to selected users of the electronic catalog based on stored preference information for said users.

9. The method of claim 1, wherein the work is a book, and the method comprises the server system communicating with the third party verifier to verify that the user is an author of the book.

10. The method of claim 1, wherein the work is a musical work, and the method comprises the server system communicating with the third party verifier to verify that the user is a musical artist that created the work.

11. The method of claim 1, wherein the creator verification request identifies a plurality of works selected by said user, and specifies, for each such work, a third party verifier for verifying creatorship.

12. A server system comprising one or more computing devices and computer storage, said computer storage storing executable instructions that, when executed by the server system, cause the server system to perform the steps of:

providing a browsable electronic catalog, said electronic catalog comprising representations of works created by creators;

providing a creator verification user interface;

receiving a creator verification request from a user with the creator verification user interface, said creator verification request identifying a work selected by the user from the electronic catalog, and identifying a third party verifier for verifying that the user is a creator of the selected work, said third party verifier designated by the user via the creator verification user interface;

in response to the creator verification request, sending a request for the third party verifier to verify that the user is a creator of the selected work;

receiving, from the third party verifier, a reply indicating that the user is a creator of the selected work;

in response to the reply indicating that the user is a creator of the selected work, exposing to the user a content submission interface;

receiving content from the user via the content submission interface; and in response to receiving the content, incorporating the content into a page of the electronic catalog together with a designation that the content is from a creator of the work, said page being associated with the work.

13. The server system of claim 12, wherein the request for the third party verifier to verify that the user is a creator of the selected work comprises a request for the third party verifier to verify an email address of the creator of the work.

14. The server system of claim 12, wherein the request for the third party verifier comprises a request for the third party verifier to supply an email address of the creator of the work.

15. The server system of claim 12, wherein the server system is programmed to expose the content submission interface to the user at least partly by modifying an account setting of an existing account of the user to grant access rights to the user to post content to the electronic catalog as a verified creator of the work.

16. The server system of claim 12, wherein the server system is programmed to send the request to the third party verifier in further response to an automated determination that the third party has been verified.

17. The server system of claim 12, wherein the creator verification user interface comprises code executed by the server system.

18. The server system of claim 12, wherein the server system is additionally programmed to provide, on said page, a user option to subscribe to future content postings from the creator of the work.

19. The server system of claim 12, wherein the server system is additionally programmed to automatically provide the content to selected users of the electronic catalog based on stored information regarding preferences of said users.

20. The server system of claim 12, wherein the work is a book, and the server system is programmed to communicate with the third party verifier to verify that the user is an author of the book.

21. The server system of claim 12, wherein the work is a musical work, and the server system is programmed to communicate with the third party verifier to verify that the user is a musical artist associated with the work.

22. The server system of claim 12, wherein the creator verification user interface enables the user to select multiple works for submission of a creator verification request, and to separately designate, for each selected work, a third party verifier for verifying that the user is a creator of the respective work.

* * * * *